US007130945B2

(12) United States Patent
Inoue et al.

(10) Patent No.: US 7,130,945 B2
(45) Date of Patent: *Oct. 31, 2006

(54) CONTROLLING METHOD FOR TRANSMITTING RESERVE COMMANDS FROM A CONTROLLER TO TARGET DEVICES

(75) Inventors: Hiraku Inoue, Kanagawa (JP); Shinobu Ohashi, Ibaraki (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/082,817

(22) Filed: Mar. 18, 2005

(65) Prior Publication Data
US 2005/0165981 A1 Jul. 28, 2005

Related U.S. Application Data

(63) Continuation of application No. 09/591,449, filed on Jun. 9, 2000, now Pat. No. 6,910,086.

(30) Foreign Application Priority Data
Jun. 14, 1999 (JP) ............................... 11-167328

(51) Int. Cl.
G06F 13/00 (2006.01)
(52) U.S. Cl. ...................... 710/110; 709/225
(58) Field of Classification Search ............... 710/110, 710/112; 709/220–223, 225; 340/825.02
See application file for complete search history.

(56) References Cited

U.S. PATENT DOCUMENTS

| 4,652,874 A | 3/1987 | Loyer |
| 4,723,120 A | 2/1988 | Petty, Jr. |
| 4,903,016 A | 2/1990 | Murai et al. |
| 5,007,051 A | 4/1991 | Dolkas et al. |
| 5,394,556 A | 2/1995 | Oprescu |
| 5,400,246 A | 3/1995 | Wilson et al. |
| 5,418,527 A | 5/1995 | Yashiro |
| 5,420,724 A | 5/1995 | Kawamura et al. |
| 5,455,569 A | 10/1995 | Sherman et al. |
| 5,475,835 A | 12/1995 | Hickey |
| 5,481,750 A | 1/1996 | Parise et al. |

(Continued)

FOREIGN PATENT DOCUMENTS

DE 31 51 492 7/1983

(Continued)

OTHER PUBLICATIONS

George Penokie (IBM), "Persistent Reservations," SCSI Storage Interfaces, Online!, XP-002306348, Nov. 4, 1998, pp. 1-29.

(Continued)

*Primary Examiner*—Rehana Perveen
*Assistant Examiner*—Clifford Knoll
(74) *Attorney, Agent, or Firm*—Oblon, Spivak, McClelland, Maier & Neustadt, P.C.

(57) ABSTRACT

Disclosed herein are a controller device, a communication system and a controlling method for transmitting commands for designating two modes used in a setup comprising a controller device and a plurality of target devices reserved by the controller device, the devices being interconnected by a data bus for transmitting data in a predetermined communication format, one of the two modes allowing the target devices to communicate with one another, the other mode inhibiting the reserved target devices from thus communicating. Also disclosed are a communication system and a controlling method for varying between such two modes a standby time that must elapse before a command can be accepted following a bus reset, one mode permitting communication between the reserved target devices, the other mode inhibiting such intercommunication.

7 Claims, 32 Drawing Sheets

U.S. PATENT DOCUMENTS

| | | | |
|---|---|---|---|
| 5,515,211 A | 5/1996 | Kawamura |
| 5,537,605 A | 7/1996 | Teece |
| 5,539,390 A | 7/1996 | Nagano et al. |
| 5,608,879 A | 3/1997 | Cooke |
| 5,657,221 A | 8/1997 | Warman et al. |
| 5,687,334 A | 11/1997 | Davis et al. |
| 5,712,834 A | 1/1998 | Nagano et al. |
| 5,729,717 A | 3/1998 | Tamada et al. |
| 5,778,064 A | 7/1998 | Kori et al. |
| 5,787,259 A | 7/1998 | Haroun et al. |
| 5,790,876 A | 8/1998 | Shima et al. |
| 5,793,366 A | 8/1998 | Mano et al. |
| 5,815,631 A | 9/1998 | Sugiyama et al. |
| 5,847,771 A | 12/1998 | Cloutier et al. |
| 5,850,573 A | 12/1998 | Wada |
| 5,875,108 A | 2/1999 | Hoffberg et al. |
| 5,887,193 A | 3/1999 | Takahashi et al. |
| 5,887,194 A | 3/1999 | Carson et al. |
| 5,963,450 A | 10/1999 | Dew |
| 5,973,748 A | 10/1999 | Horiguchi et al. |
| 5,987,126 A | 11/1999 | Okuyama et al. |
| 6,199,136 B1 | 3/2001 | Shteyn |
| 6,259,707 B1 | 7/2001 | Dara-Abrams et al. |
| 6,446,149 B1 | 9/2002 | Moriarty et al. |
| 6,504,847 B1 | 1/2003 | Horlander |
| 6,546,419 B1 | 4/2003 | Humpleman et al. |

FOREIGN PATENT DOCUMENTS

| | | |
|---|---|---|
| EP | 0 371 719 | 6/1990 |
| EP | 0 573 204 | 12/1993 |
| EP | 0 626 635 | 11/1994 |
| EP | 0 637 157 | 2/1995 |
| EP | 0 727 729 | 8/1996 |
| EP | 0 800 312 | 10/1997 |
| JP | 4-97468 | 3/1992 |
| JP | 7-134628 | 5/1995 |
| WO | WO 96/07971 | 3/1996 |

OTHER PUBLICATIONS

Bob Snively, "Correction in interaction of persistent and legacy reservations," NCITS Technical Committee T10, Online!., XP-002308349, Mar. 2, 1999, pp. 1-4.

Printer Working Group C(PWG-C), et al., "PWG-C proposal to the 1394 Trade Association AV WG: AV/C Managed Asynchronous Serial Bus Connections," Printer Working Group, XP-002215801, Jul. 7, 1998, pp. 1-90.

A. Gefrides et al., "Standard Bus Connects Up to 126 Peripherals: Plug and Play with USB," Applications Connectors, May 1996, pp. 36-38.

G. Hoffman et al., "IEEE 1394: A Ubiquitous Bus," IEEE May 3, 1995, pp. 334-338.

D. Bursky, "Networking Scheme Exploits Existing RS-232 Interface," Electronic Design, vol. 35, No. 13, May 1987, pp. 65-68.

IEEE Standard for a High Performance Serial Bus, IEEE Computer Society, IEEE Standards 1394-1995, Aug. 1996.

Hitachi, Ltd., et al., 5C Digital Transmission Content Protection White Paper, Revision 1.0, Jul. 14, 1998.

IEEE1394 BUS CONNECTION

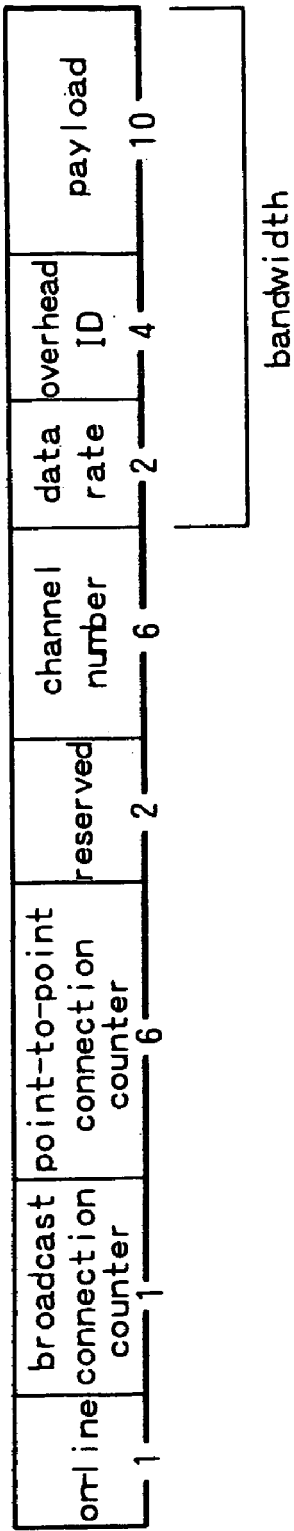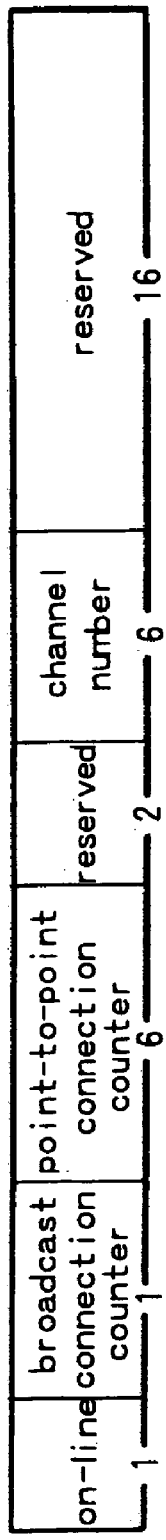

FIG.18 ctype/response

| | | |
|---|---|---|
| Command | 0000 | CONTROL |
| | 0001 | STATUS |
| | 0010 | INQUIRY |
| | 0011 | NOTIFY |
| | 0100 | |
| | ⟨ | (reserved) |
| | 0111 | |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved) |
| | 1111 | INTERIM |

FIG.19A

| subunit_type | |
|---|---|
| 00000 ~ | Monitor |
| | (reserved) |
| 00011 | Disc recorder/player |
| 00100 | VCR |
| 00101 | Tuner |
| 00111 | Camera |
| | (reserved) |
| 11111 | Unit* |

FIG.19B

| opcode | Operation Code |
|---|---|
| 00h | VENDOR-DEPENDENT |
| 50h | SEACH MODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h ~ | WIND |

*AN OPCODE TABLE IS PROVIDED FOR EACH SUBUNIT

*AN OPERAND IS DEFINED FOR EACH OPCODE

Location of plug address spaces

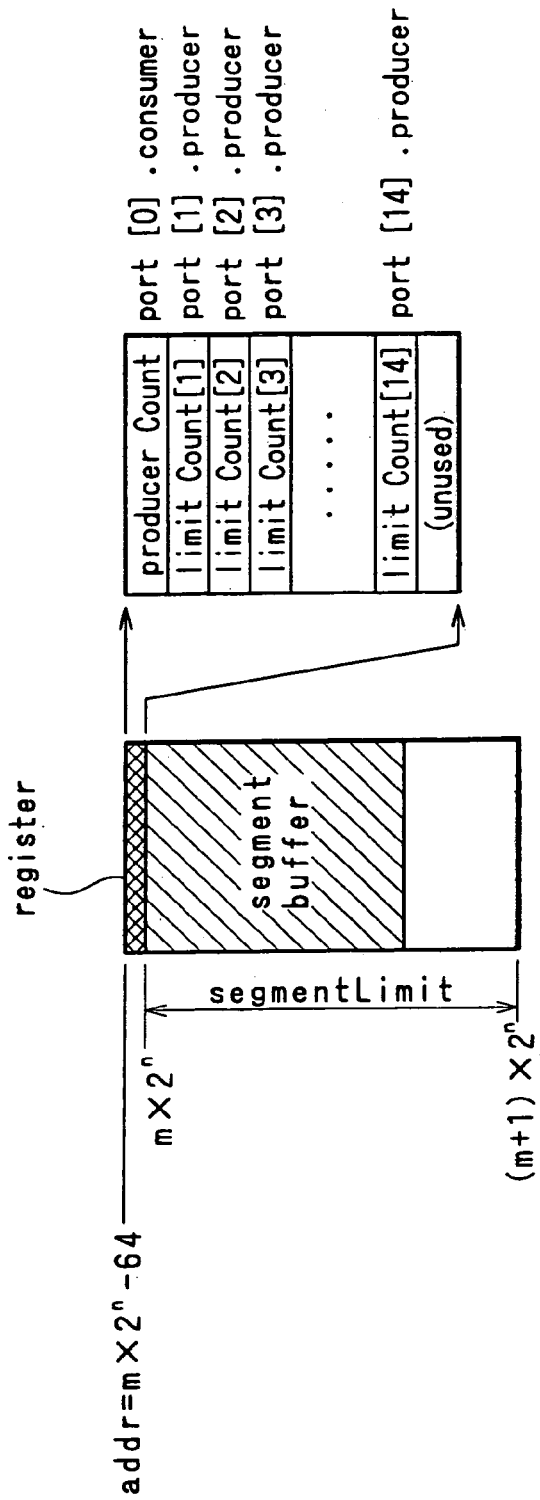

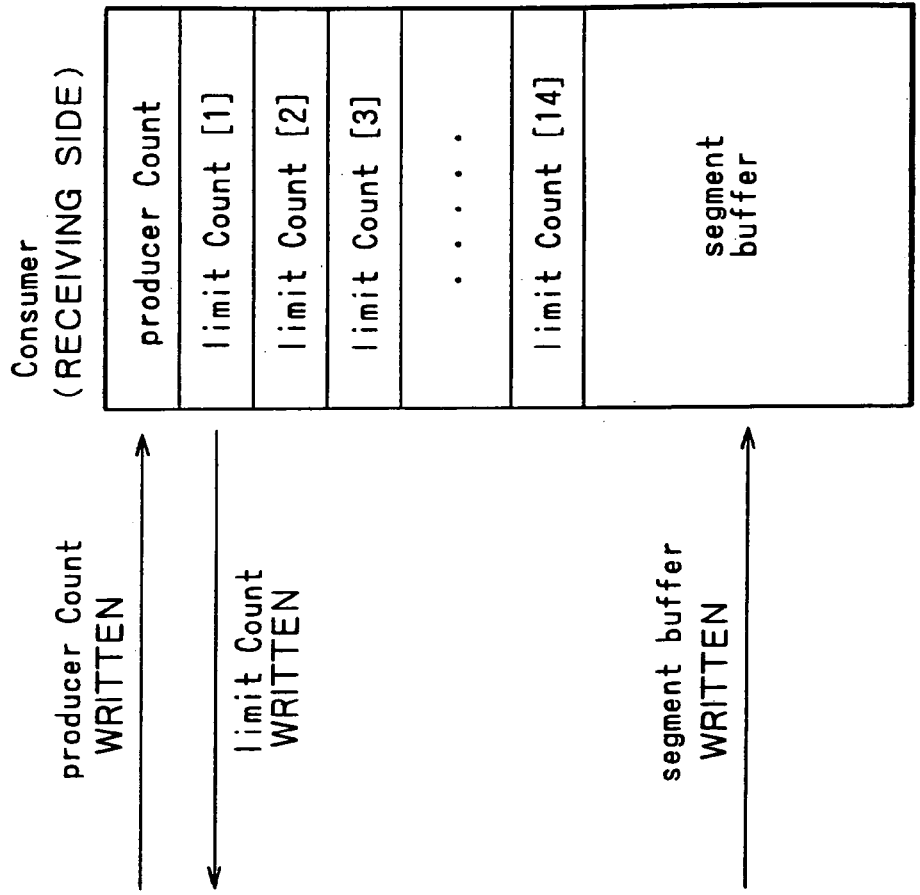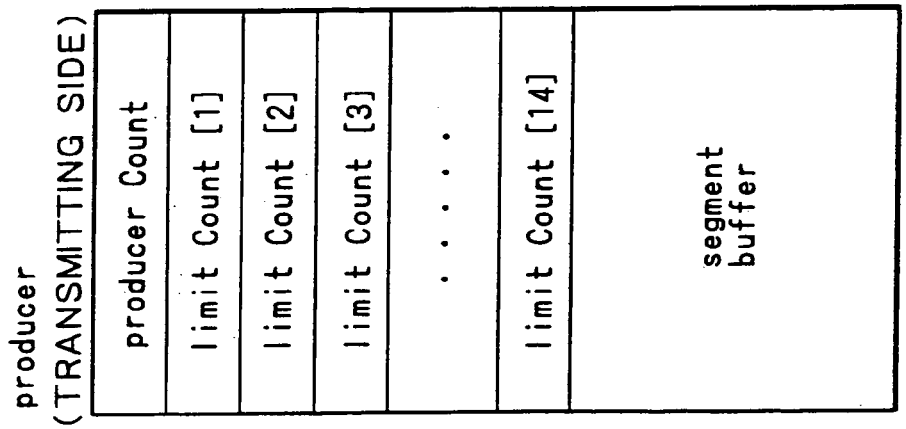

PROCEDURES FOR Asynchronous Connection TRANSMISSION AND RECEPTION

RESERVE control command

RESERVE status command

FIG. 30

| | msb | | | | | | | lsb |
|---|---|---|---|---|---|---|---|---|
| operand | VENDOR-DEPENDENT(00h) | | | | | | | |
| operand [0] | company_ID(08h) | | | | | | | |
| operand [1] | (00h) | | | | | | | |
| operand [2] | (46h) | | | | | | | |
| operand [3] | (F0h) | | | | | | | |
| operand [4] | (03h) | | | | | | | |
| operand [5] | (01h) | | | | | | | |
| operand [6] | (02h) | | | | | | | |
| operand [7] | MD-RESERVE (01h) | | | | | | | |
| operand [8] | priority | | | | | | | |
| operand [9] | text | | | | | | | |
| ..... | | | | | | | | |
| operand [20] | | | | | | | | |

MD-RESERVE control/status command

CONTROLLING METHOD FOR TRANSMITTING RESERVE COMMANDS FROM A CONTROLLER TO TARGET DEVICES

CROSS-REFERENCE TO RELATED APPLICATIONS

The present application is a continuation of U.S. application Ser. No. 09/591,449 filed on Jun. 9, 2000 now U.S. Pat. No. 6,910,086, and in turn claims priority to JP 11-167328 filed on Jun. 14, 1999.

BACKGROUND OF THE INVENTION

The present invention relates to a controller device, a communication system and a controlling method for transmitting commands for designating two modes used in a setup including a controller device and a plurality of target devices reserved by the controller device, the devices being interconnected by a data bus for transmitting data in a predetermined communication format, one of the two modes allowing the target devices to communicate with one another, the other mode inhibiting the reserved target devices from thus communicating. More particularly, the invention relates to a communication system and a controlling method for varying between such two modes a standby time that must elapse before a command can be accepted following a bus reset, one mode permitting communication between the reserved target devices, the other mode inhibiting such intercommunication.

DESCRIPTION OF THE RELATED ART

Today, the IEEE (Institute of Electrical and Electronic Engineers) 1394 data interface has gained widespread acceptance as a digital data interface. Faster than the SCSI among others in terms of data transfer, the IEEE 1394 data interface is known to permit isochronous communication whereby data of a predetermined size are transmitted and received periodically. As such, the IEEE 1394 data interface is deemed advantageous in transferring stream data such as AV data in real time.

Under these circumstances, data transmission systems have been proposed which interconnect various digital AV (audio visual) devices and electronic equipment such as a personal computer via a data bus complying with digital data interface standards such as the IEEE 1394.

Such AV systems permit so-called remote control. For example, where a disc recording and reproducing apparatus is connected with a personal computer, suitably operating the personal computer can control the disc recording and reproducing apparatus in recording and playback as well as in editing recorded sources.

According to digital data interface standards such as those of the IEEE 1394, the device executing remote control is called a controller and the device placed under remote control is called a target.

Where remote control is provided over AV systems connected through the IEEE 1394 data interface as in the above example, it may happen that one target is subject to remote control by a plurality of controllers or that local keys of the target (e.g., operation keys attached to the device acting as the target) remain effective. Such cases are likely to lead to processing conflicts between the controller(s) and the target or to consequential inconsistencies therebetween.

This applicant already proposed a solution to such irregularities. The proposed solution involved defining reserve commands of a data interface allowing a controller to reserve a target device under remote control (e.g., PCT Application No. PCT/JP99/06411).

Illustratively, when a reserve command sent by a controller to a target is accepted, the target enters a reserve mode. In the reserve mode, the target rejects commands (i.e., rejects communication) from any device other than the controller that has transmitted the reserve command. Processing conflicts conceivable between the controller and the target or possible consequential inconsistencies therebetween are circumvented by inhibiting attempts to operate the target by any device other than the controller.

In practice, however, an AV system establishing a reserve mode can run into some problems. For example, when a player is operated to copy or dub data to a recorder, it is necessary to communicate copy control information or like data regarding copyrights between the player and the recorder. If at least one of the player and the recorder is reserved by another device such as a personal computer, there can be no communication of the copy control information or the like between the player and the recorder, which inhibits copying of the appropriate data.

That is, establishing the reserve mode can disable communication between the target device and any device other than the controller reserving the target when the target needs to carry out an operation with a different device for a given purpose.

SUMMARY OF THE INVENTION

The present invention has been made in view of the above circumstances and provides a controller device, a communication system and a controlling method for allowing a device selected as a target in a reserve mode by another device acting as the controller to communicate necessary information with yet another device other than the controller through a data interface.

In carrying out the invention and according to one aspect thereof, there is provided a controller device for controlling a plurality of target devices connected to a data bus for transferring data in a predetermined communication format, the controller device including first command generating means for generating a first reserve command for inhibiting any one of the target devices from getting accessed by another controller device or by any other target device, second command generating means for generating a second reserve command for reserving any one of the target devices so that the reserved target device is allowed to accept a specific command transferred at least from another target device, and transmitting means for selectively transmitting to the target devices the first reserve command generated by the first command generating means and the second reserve command generated by the second command generating means.

According to another aspect of the invention, there is provided a communication system including: a controller device, a data bus for transferring data in a predetermined communication format, and a plurality of target devices connected via the data bus to the controller device, wherein the controller device includes: first command generating means for generating a first reserve command for inhibiting any one of the target devices from getting accessed by another controller device or by any other target device, second command generating means for generating a second reserve command for reserving any one of the target devices so that the reserved target device is allowed to accept a specific command transferred at least from another target device, third command generating means for generating a bus reset command for resetting the data bus for transferring data in the predetermined communication format, and transmitting means for selectively transmitting to the target devices the first reserve command generated by the first command generating means, the second reserve command generated by the second command generating means, and the bus reset command generated by the third command generating means, and wherein each of the target devices includes: receiving means for receiving from the transmitting means the first reserve command generated by the first command generating means, the second reserve command generated by the second command generating means, and the bus reset command generated by the third command generating means, judging means for judging whether a reserve command received by the receiving means is the first reserve command or the second reserve command, and controlling means for validating a reserve command received by the receiving means upon elapse of a first predetermined time following a bus reset if the reserve command thus received is judged by the judging means to be the first reserve command, the controlling means further validating a reserve command received by the receiving means upon elapse of a second predetermined time following the bus reset, the second predetermined time being shorter than the first predetermined time, if the reserve command thus received is judged by the judging means to be the second reserve command.

Other objects, features and advantages of the invention will become more apparent upon a reading of the following description and appended drawings.

BRIEF DESCRIPTION OF THE DRAWINGS

FIG. 15A is a schematic view of a data structure in an output plug control register oPCR[n];

FIG. 15B is a schematic view of a data structure in an input plug control register iPCR[n];

FIG. 18 is a ctype/response table;

FIG. 19A is a table of a subunit_type data structure;

FIG. 19B is a table of commands in an operation code used when the subunit_type is a VCR;

FIG. 22A is a view of a data structure in a plug address;

FIG. 22B is a view of a data structure constituting a register in a plug address;

FIG. 22C is an address offset table;

FIG. 23A is a data structure constituting a register in a plug address on the producer side;

FIG. 23B is a data structure constituting a register in a plug address on the consumer side;

FIG. 30 is a view of a data structure in a vender dependent reserve command for reserving an MD recorder/player;

DESCRIPTION OF THE PREFERRED EMBODIMENTS

Preferred embodiments of this invention will now be described in the following order:
1. System Configuration
   1-1. Overall Configuration
   1-2. MD Recorder/Player
   1-3. CD Player
   1-4. Personal Computer
2. Data Communications of the Invention in Compliance with the IEEE 1394
   2-1. Overview
   2-2. Stack Model
   2-3. Forms of Signal Transmission
   2-4. Bus Connection between Devices
   2-5. Packets
   2-6. Transaction Rules
   2-7. Addressing
   2-8. CIP (Common Isochronous Packet)
   2-9. Connection Management
   2-10. Commands and Responses under FCP
   2-11. AV/C Command Packet
   2-12. Plugs
   2-13. Asynchronous Connection Transmission Procedures
   2-14. Reserve Commands
   2-15. Background of This Invention
   2-16. Vender Dependent Reserve Commands
   2-17. Processing by the Target in Reserve Mode 1. System Configuration
   1-1. Overall Configuration FIG. 1 shows a typical configuration of an inventive AV system whose components are interconnected through an IEEE 1394 digital data interface arrangement.

Figure 1:
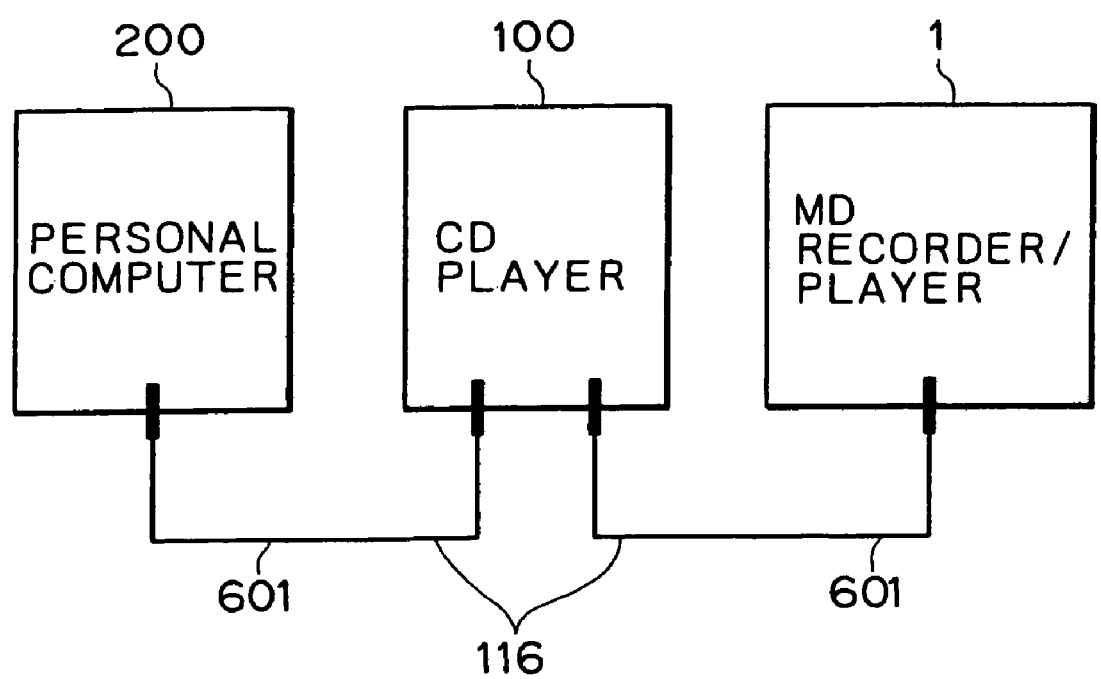
FIG. 1 is a block diagram of devices connected by an IEEE 1394 bus.

The AV system in FIG. 1 has a personal computer 200, a CD player 100 and an MD recorder/player 1 connected by cables 601 compatible with the IEEE 1394 data interface. The connection allows the personal computer 200, CD player 100 and MD recorder/player 1 to communicate with one another via an IEEE 1394 bus 116.

The MD recorder/player 1 is a digital audio device capable of recording and reproducing audio data to and from a magneto-optical disc known as the Mini-disc (MD; registered trademark). Illustratively, the MD recorder/player 1 records to an MD digital audio data sent from the CD player 100 through the IEEE 1394 bus 116. The MD recorder/player 1 retrieves digital audio data from an MD and sends the retrieved data over the bus 116 illustratively to the personal computer 200 for auditory output from its speakers.

The CD player 100 is audio equipment for reproducing audio data from a compact disc (CD). Retrieved audio data from the CD are output through the IEEE 1394 bus 116.

The personal computer 200 receives via the IEEE 1394 bus 116 reproduced audio data from the CD player 100 or MD recorder 1, and subjects the received data to auditory output or to such editing processes as music sequence change, division and connection. The personal computer 200 is also capable of executing remote control under which the CD player 100 or MD recorder/player 1 is controlled in recording or playback operations.

The functions above are implemented by installing suitable application software in the personal computer 200.

1-2. MD Recorder/Player

Figure 2:
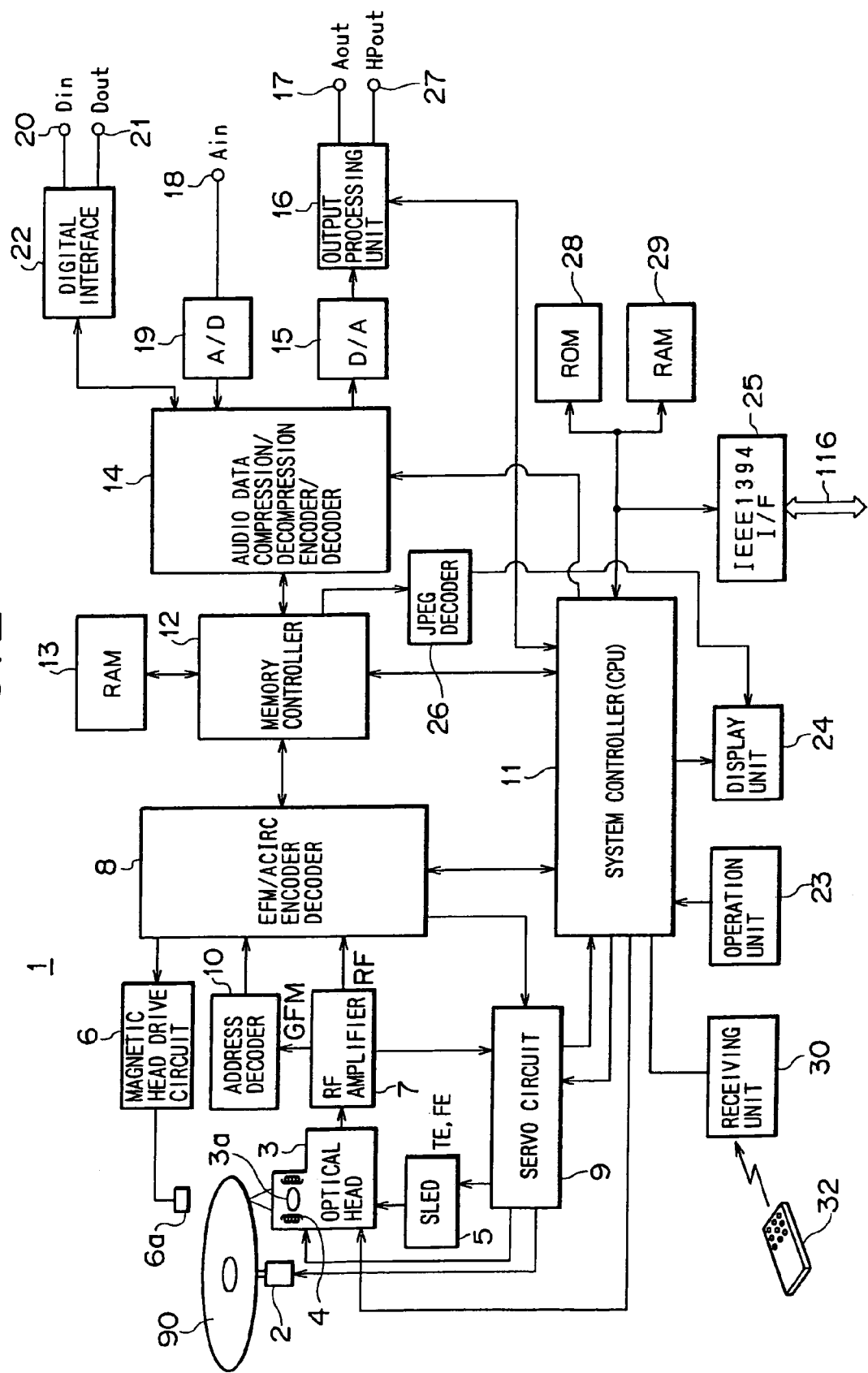
FIG. 2 is a block diagram of a recording and reproducing apparatus.

FIG. 2 depicts an internal structure of a recording and reproducing apparatus (MD player/recorder) 1 included in an AV system 3 embodying the invention.

A magneto-optical disc (Mini-disc) 90 with audio data stored thereon is rotated by a spindle motor 2. At the time of recording or playback, an optical head 3 emits a laser beam onto the magneto-optical disc 90.

For recording, the optical head 3 provides a high-level laser output to heat recording tracks of the disc up to the Curie temperature. For playback, the optical head 3 performs a laser output on a relatively low level to detect data from reflected light coming from the disc through the magnetic Kerr effect.

The optical head 3 has an optical system constituted by a laser diode, by a polarization beam splitter and by an object lens, as well as detectors for capturing reflected light. The object lens 3a is held by a two-axis mechanism 4 in-a manner radially relocating over the disc surface and moving thereto and therefrom.

A magnetic head 6a is positioned in symmetric relation to the optical head 3 across the disc 90. In operation, the magnetic head 6a applies a magnetic field modulated by supplied data to the magneto-optical disc 90.

The optical head 3 as a whole and the magnetic head 6a are moved radially over the disc by a sled mechanism 5.

Upon playback, information retrieved from the disc 90 by the optical head 3 is supplied to an RF amplifier 7. In turn, the RF amplifier 7 processes the supplied information and extracts therefrom a reproduced RF signal, a tracking error signal TE, a focus error signal FE, and groove information GFM, i.e., absolute position information recorded in wobbling grooves through frequency modulation at a predetermined frequency on the magneto-optical disc 90.

The reproduced RF signal thus extracted is sent to an EFM/ACIRC encoder/decoder 8. The tracking error signal TE and focus error signal FE are fed to a servo circuit 9. The groove information GFM is forwarded to an address decoder 10.

The servo circuit 9 generates various servo drive signals upon receipt of the tracking error signal TE and focus error signal FE and in accordance with a track jump command and an access command from a system controller 11 (microcomputer) as well as detected rotating speed information from the spindle motor 2. The servo drive signals thus generated are used to control the two-axis mechanism 4 and sled mechanism 5 for focusing and tracking control and to keep the spindle motor 2 at a constant linear velocity (CLV).

The address decoder 10 decodes the supplied groove information GFM to extract address information therefrom. The address information is sent to the system controller 11 for control over various operations.

The reproduced RF signal is subjected to such decoding processes as EFM (eight to fourteen modulation) demodulation and CIRC (cross interleave Reed-Solomon coding) by the EFM/ACIRC encoder/decoder 8. During the processing, address and sub-code data are extracted and fed to the system controller 11.

Audio data having undergone such decoding processes as EFM demodulation and CIRC by the EFM/ACIRC encoder/decoder 8 are written temporarily to a buffer memory 13 under control of a memory controller 12. Retrieval of data from the disc 90 by the optical head 3 and transfer of reproduced data from the optical head 3 to the buffer memory 13 are carried out at a rate of 1.41 Mbits/sec., usually in an intermittent fashion.

The data written to the buffer memory 13 are retrieved in a properly timed manner for transfer at a rate of 0.3 Mbits/sec. to an audio data compression/decompression encoder/decoder 14. The encoder/decoder 14 subjects the received data in compressed format to decoding and other related reproduced-signal processes to generate a digital audio signal sampled at a frequency of 44.1 KHz and quantized in 16 bits.

The digital audio signal is converted to an analog audio signal by a D/A converter 15. The analog signal is sent to an output processing unit 16 for level and impedance adjustment before being output as an analog audio signal Aout through a line output terminal 17 to an external device. The analog audio signal is also fed to a headphone output terminal 27 as a headphone output HPout to headphones that may be connected.

The digital audio signal following decoding by the audio data compression/decompression encoder/decoder 14 is sent to a digital interface 22 for output as a digital audio signal Dout through a digital output terminal 21 to an external device. Illustratively, the signal may be output to an external device over an optical cable.

An analog audio signal Ain fed to a line input terminal 18 for writing to the magneto-optical disc 90 is first converted to a digital audio signal by an A/D converter 19. The digital audio signal is supplied to the audio data compression/decompression encoder/decoder 14 for audio data compression encoding.

If a digital audio signal Din is supplied through a digital input terminal 20 from an external device, the digital interface 22 extracts control codes from the supplied data. The audio data are forwarded to the audio data compression/decompression encoder/decoder 14 for audio data compression encoding.

Although not shown, a microphone input terminal may obviously be provided to accept microphone input as an input signal as well.

The data compressed by the audio data compression/decompression encoder/decoder 14 into recording data are written in a temporarily cumulative manner to the buffer memory 13 by the memory controller 12. The data are then retrieved from the buffer memory 13 in increments of a predetermined data size and sent to the EFM/ACIRC encoder/decoder 8 for encoding processes such as CIRC encoding and EFM. After the encoding operation by the EFM/ACIRC encoder/decoder 8, the data are fed to a magnetic head drive circuit 6.

The magnetic head drive circuit 6 supplies the magnetic head 6*a* with a magnetic head drive signal in accordance with the encoded recording data. Specifically, the magnetic head drive circuit 6 causes the magnetic head 6*a* to apply an N or S field to the magneto-optical disc 90. At this time, the system controller 11 provides the optical head 3 with a control signal to output a recording-level laser beam.

An operation unit 23 has controls made up of keys and dials to be operated by a user. The controls cover recording and reproducing operations such as playback, recording, temporary halt, stop, fast forward (FF), rewind (REW), and auto music search (AMS); playing mode-related operations such as normal playback, program playback and shuffle playback; display mode-related operations performed to switch display status of a display unit 24; and program editing operations such as track segmentation, track concatenation, track erasure, track name input, and disc name input.

Operating information coming from these operation keys and dials are sent to the system controller 11 which carries out control operations accordingly.

This embodiment of the invention includes a receiving unit 30 that receives command signals transmitted by a remote controller 32 using illustratively infrared radiation. The receiving unit 30 decodes a received signal to output command code to the system controller 11. The system controller 11 also performs its control operations based on the operating information coming from the receiving unit 30.

The display unit 24 is controlled in terms of display operation by the system controller 11. The system controller 11 transmits data to be displayed to a display driver inside the display unit 24 for data display. Given the data, the display driver drives accordingly the display unit 24 such as a liquid crystal display in display operation so that numerals, characters and symbols are displayed.

The display unit 24 indicates operation mode status of the disc currently loaded for recording or playback, as well as the track number, recording/playback time and editing status.

The disc 90 is capable of storing character information such as track names and album titles to be managed in connection with programs furnished as main data. Characters upon storage as character information are displayed on the display unit 24, and character information retrieved from the disc is also displayed.

With this embodiment, the disc 90 may record auxiliary data as a data file independent of music and other data constituting programs.

A data file as auxiliary data is made of information such as characters and still pictures. These characters and still pictures may be output and displayed by the display unit 24.

This embodiment of the invention has a JPEG decoder 26 designed to display still pictures and characters made of auxiliary data onto the display unit 24.

More specifically, still picture data making up a data file as auxiliary data are recorded in a compressed file format complying with the JPEG (Joint Photographic Coding Experts Group) criteria. The JPEG decoder 26 admits through the memory controller 12 illustratively a still picture data file that has been retrieved from the disc 90 and written cumulatively to the buffer memory 13. The received file is decompressed as per the JPEG criteria before being output to the display unit 24. This causes the display unit 24 to display the still picture data made up of auxiliary data.

For output of character information or still picture information constituted by auxiliary data, it is often preferred to install a full-dot display or CRT display of a relatively large size offering an appreciably high degree of display freedom on its screen. In that case, the auxiliary data may be output through another interface 25 and displayed on such an externally furnished monitor.

Auxiliary data files may be recorded by the user on the disc 90. For such data file input, it may be necessary to use an image scanner, a personal computer and/or a keyboard. Information constituting the auxiliary data may then be input through the interface 25 from these externally added devices.

For this embodiment, an IEEE 1394 interface is assumed to be adopted as the interface 25. In the description that follows, the interface 25 and the IEEE 1394 interface will be referred to interchangeably. The IEEE 1394 interface 25 is connected to various external devices through the IEEE 1394 bus 116.

The system controller 11 is a microcomputer comprising an internal interface. The microcomputer performs the above-described diverse control operations.

A program ROM 28 stores programs for allowing this recording and reproducing apparatus to implement various operations. A work RAM 29 accommodates as needed data and programs for allowing the system controller 11 to carry out various processes.

To write or reproduce data to or from the disc 90 requires retrieving therefrom management information, i.e., P-TOC (pre-mastered TOC (table of contents)) and U-TOC (user TOC). Given such management information, the system controller 11 identifies addresses of those areas on the disc.90 to or from which to record or retrieve data. The management information is retained in the buffer memory 13.

When the disc 90 is loaded, the system controller 11 retrieves its management information by reproducing data from the innermost region on the disc where the information in question is recorded. The retrieved information is placed into the buffer memory 13 which may be referenced subsequently to execute recording, playback or editing of programs on the disc 90.

The U-TOC is updated in keeping with program data recordings and various editing processes. Every time data are recorded or edited, the system controller 11 updates the U-TOC information in the buffer memory 13. The update operation is paralleled in a suitably timed manner by an update of the U-TOC area on the disc 90.

The disc 90 accommodates auxiliary data files apart from the programs. An AUX-TOC is formed on the disc 90 for managing these auxiliary data files.

Upon retrieval of the U-TOC, the system controller 11 also reads out the AUX-TOC and places it into the buffer memory 13. Managed status of the auxiliary data may later be referenced by looking up the AUX-TOC in the buffer memory 13.

The system controller 11 reads auxiliary data files as needed and in a suitably timed fashion or simultaneously with retrieval of the AUX-TOC. The retrieved files are placed into the buffer memory 13. The auxiliary data files are then output in a properly timed manner according to the AUX-TOC and displayed in the form of characters and images on the display unit 24 or on an external device via the IEEE 1394 interface 25.

In the above setup, the IEEE 1394 interface 25 is capable of transmitting and receiving audio data. That means the MD recorder/player embodying this invention receives audio data transferred through the IEEE 1394 interface 25 and records the received data to the disc 90.

If the transferred audio data are illustratively digital audio data sampled at a frequency of 44.1 KHz and quantized in 16 bits, then the data are forwarded through the system controller 11 to the audio data compression/decompression encoder/decoder 14 for audio data compression.

If the transferred audio data turn out to be compressed audio data in compliance with the compression format of this MD recorder/player, then the data are sent through the system controller 11 to the memory controller 12.

1-3. CD Player

Figure 3:
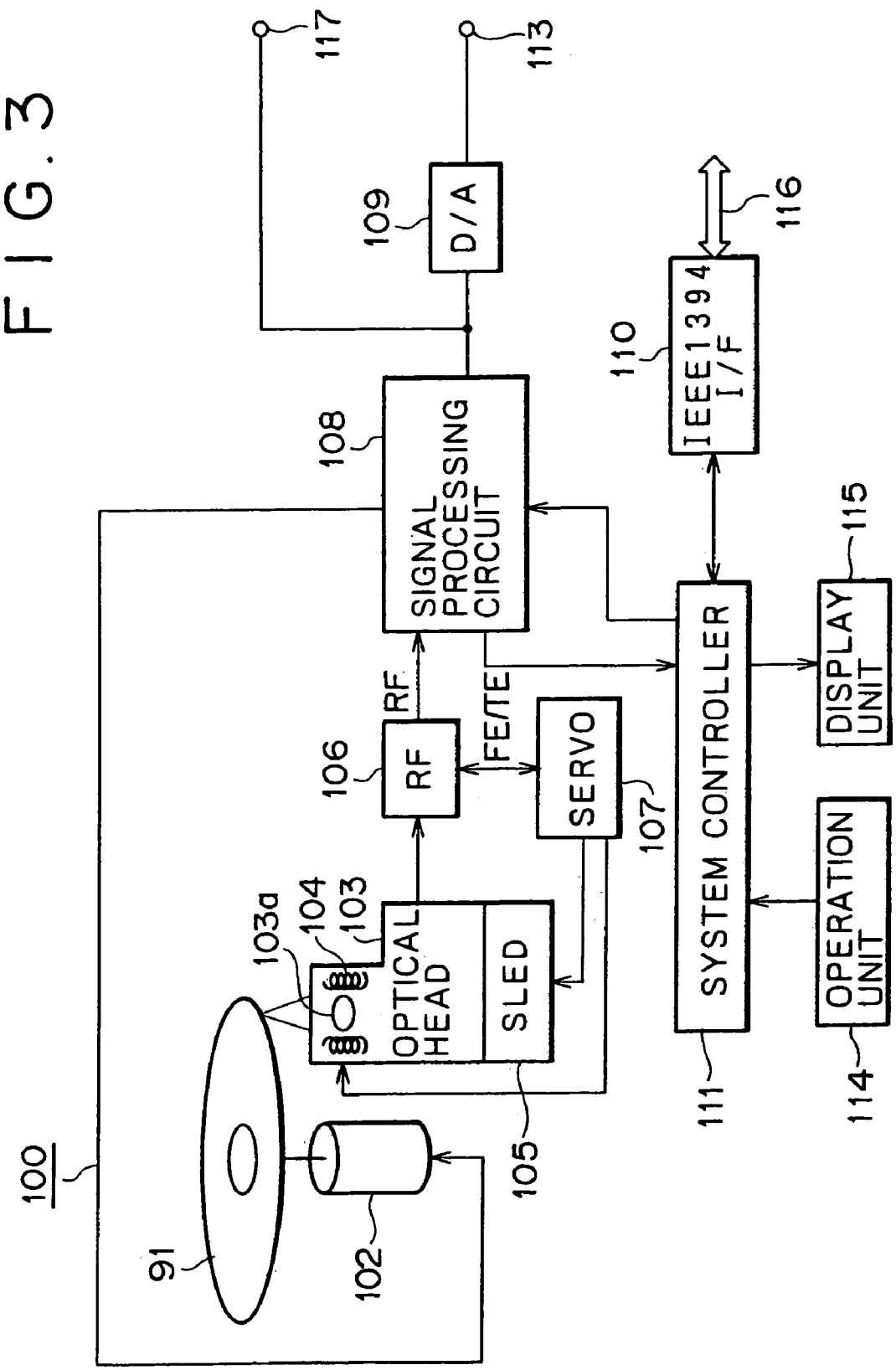
FIG. 3 is a block diagram of a reproducing apparatus.

A structure of the CD player 100 will now be described with reference to FIG. 3. The CD player 100 uses a spindle motor 102 to keep the revolutions of an optical disc (compact disc or CD) 91 at a constant linear velocity (CLV).

An optical head 103 comprises an object lens 103a and a two-axis mechanism 104 in addition to a semiconductor laser device and a light-receiving unit, neither shown. The light-receiving unit captures light reflected from the surface of the optical disc under semiconductor laser irradiation.

The two-axis mechanism 104 is constituted by a focusing coil to drive the object lens 103a for movements to and away from the optical disc 91, and by a tracking coil to drive the object lens 103a for radial movements across the optical disc 91.

The optical head 103 itself is moved as a whole by a sled mechanism 105 in the radial direction over the optical head 91.

Reflected light information captured by the light-receiving unit inside the optical head 103 is fed to an RF amplifier 106 for current-to-voltage conversion followed by matrix computation. In turn, the RF amplifier 106 produces a focus error signal FE, a tracking error signal TE and an RF signal.

The RF signal, which is a reproduced signal, is extracted as light quantity information stemming from laser beam irradiation onto the disc 91.

The focus error signal FE and tracking error signal TE generated by the RF amplifier 106 are supplied to a servo circuit 107 for phase compensation and gain adjustment. Thereafter the signals are sent through a drive amplifier (not shown) to the focusing coil and tracking coil in the two-axis mechanism 104.

Given the tracking error signal TE, the servo circuit 107 generates accordingly a sled error signal through a low-pass filter (LPF). The sled error signal is fed to the sled mechanism 105 through a sled drive amplifier (not shown).

The RF signal produced by the RF amplifier 106 is sent to a signal processing circuit 108 for binarization, EFM demodulation and CIRC error correction, whereby a digital audio signal is extracted as reproduced data.

Given the EFM signal in binary format, the signal processing circuit 108 generates accordingly a spindle error signal for controlling disc revolutions. The spindle error signal is supplied to the spindle motor 102.

Upon receipt of the binary EFM signal, the signal processing circuit 108 further executes a PLL (phase locked loop) to generate a reproduced clock.

The operations of the servo circuit 107 and signal processing circuit 108 are controlled by a system controller 111.

The digital audio signal from the signal processing circuit 108 is sent illustratively through the system controller 111 to an IEEE 1394 interface 110 for conversion to data complying with an IEEE 1394 digital interface format. The converted data are transmitted over the IEEE 1394 bus 116.

The IEEE 1394 interface is capable of transmitting inter-device control signals illustratively through the IEEE 1394 interface 110 of the CD player and through the IEEE1394 interface 25 of the MD recorder/player 1. This eliminates the need for conventional arrangements for communicating control signals through a terminal 117 (on the CD player) and the terminal 21 (on the MD recorder/player 1).

The digital audio signal from the signal processing circuit 108 is split and fed to a D/A converter 109 as well. The D/A converter 109 converts the input digital audio signal to an analog audio signal that is sent through an output terminal 113 to the input terminal 17 of the MD recorder 1.

An operation unit 114 has a variety of keys (controls) allowing the user at least to control various playback operations of the CD player 100. When a key is operated, the operation unit 114 outputs a command signal representing the operated key to the system controller 111.

Under control of the system controller 111, a display unit 115 indicates playback status (playing time, reproduced track, playback mode, etc.).

The system controller 111 in the CD player 100 carries out control processes for various internal function circuits causing the CD player 100 to execute diverse playback operations. Such control processes include those for performing operations reflecting the commands sent from the operation unit 114.

1-4. Personal Computer

Figure 4:
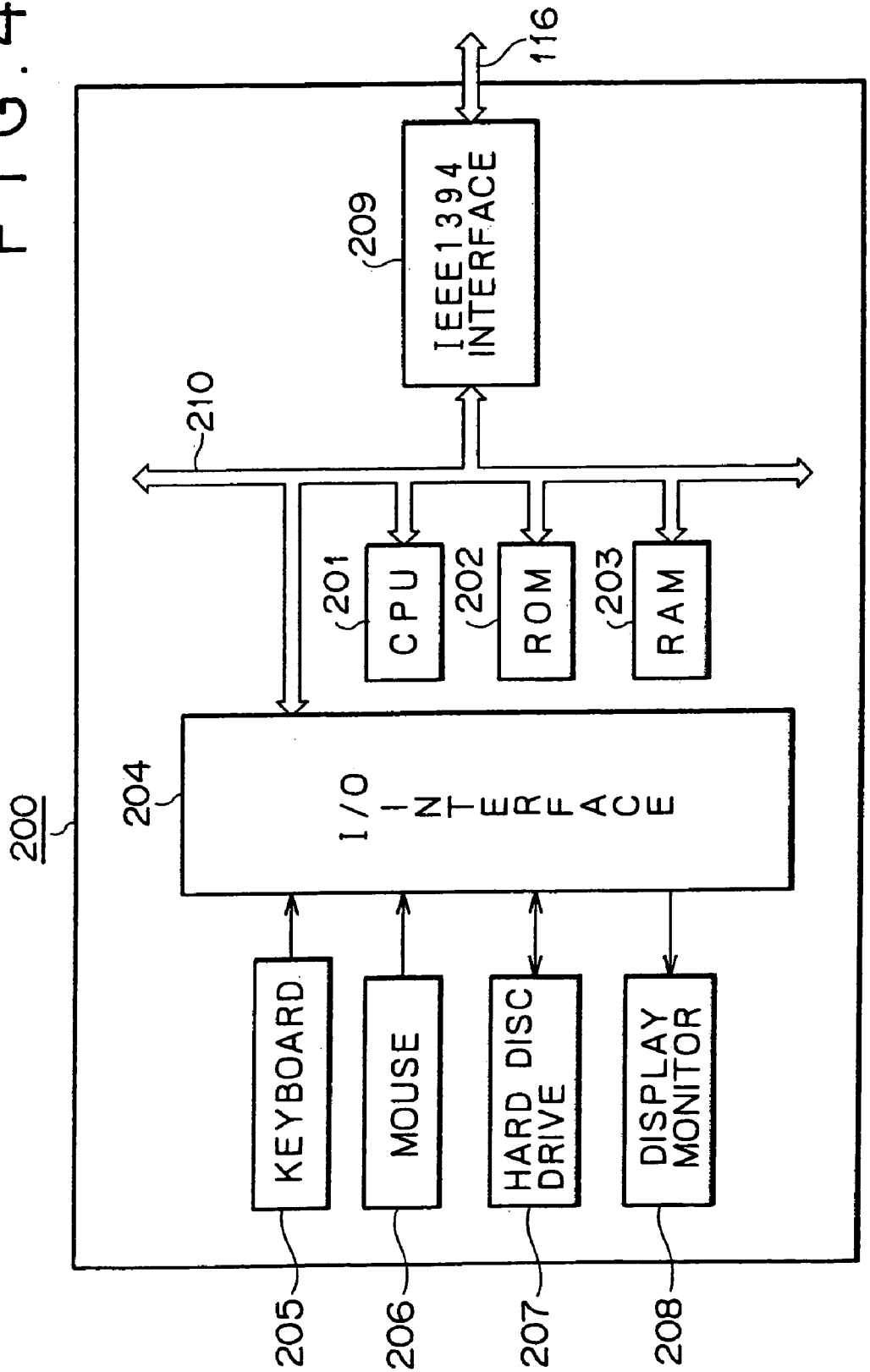
FIG. 4 is a block diagram of a personal computer.

An internal structure of the personal computer 200 will now be described by referring to FIG. 4.

As illustrated, the personal computer 200 has an IEEE 1394 interface 209 for exchanging data with an external entity. The IEEE 1394 interface 209 is connected to the IEEE 1394 bus 116 serving as an external data bus for two-way communication with an external device.

The IEEE 1394 interface 209 demodulates packets received over the IEEE 1394 bus 116, extracts data from the received packets, converts the extracted data to a data format compatible with internal data communication, and outputs the converted data to a CPU (central processing unit) 201 through an internal bus 210.

Furthermore, the IEEE 1394 interface 209 admits output data under control of the CPU 201, subjects the data to modulation processes based on an IEEE 1394 format such as conversion into packets, and transmits the modulated data to the outside over the IEEE 1394 bus 116.

The CPU 201 carries out a number of processes in accordance with programs retained illustratively in a ROM (Read Only Memory) 202. This embodiment has in its ROM 202 programs for controlling the IEEE 1394 interface 209 to permit data exchanges in keeping with the IEEE 1394 criteria. That is, the personal computer 113 has a set of hardware and software for enabling data exchanges under the IEEE 1394.

A RAM (Random Access Memory) 203 accommodates as needed data and programs for allowing the CPU 201 to execute various processes.

An input/output interface 204 is connected to a keyboard 205 and a mouse 206. Operation-induced signals from these components are forwarded through the interface 204 to the CPU 201. The I/O interface 204 is also connected to a hard disc drive 207 containing hard discs as a storage medium. Through the I/O interface 204, the CPU 201 may write and read data and programs to and from the hard discs in the hard disc drive 207. In this setup, the I/O interface 204 is further connected to a display monitor 208 for picture display.

The internal bus 210 is constituted illustratively by a PCI (Peripheral Component Interconnect) bus or by a local bus. As such, the internal bus 210 provides interconnections between the internal function circuits.

In the MD recorder/player 1 and CD player 100 described above, their IEEE 1394 interface adopts basically the same functional structure as that of the personal computer 113.

More specifically, the MD recorder/player 1 in FIG. 2 has in its program ROM 28 programs for allowing the system controller 111 to control the IEEE 1394 interface 25. Likewise the CD player 100 in FIG. 3 has in its ROM (not shown) programs for allowing the system controller 111 to control the IEEE 1394 interface 110.

The system configuration of this embodiment wherein the components are interconnected by means of IEEE 1394 bus lines has been described only for illustrative purposes and is not limitative of the invention. Other suitable configurations may be utilized alternatively.

2. Data Communications of the Invention in Compliance with the IEEE 1394

2-1. Overview

Below is a description of how data communications of the invention take place in accordance with the IEEE 1394.

The IEEE 1394 constitutes one of serial data communication standards. Under the IEEE 1394, there are two data transmission method: isochronous communication method for periodical communications, and asynchronous communication method for asynchronous communications free of periodicity. Generally, the isochronous communication method is used for data transmission and reception while the asynchronous communication method is adopted for exchanging various control commands. A single cable allows data and commands to be transmitted and received by the two communication methods.

As described, an AV system according to the invention permits exchanging of audio data including compressed audio data as user data and auxiliary data made of picture files (JPEG still picture data) and text files compatible with an MD recorder/player, between configured devices over an IEEE 1394 bus arrangement. The AV system also allows a device acting as a controller to exercise remote control over a device selected as a target.

Audio data are time-series data that call for audio output based on playback time, which requires real time processing. In addition, audio data are far greater in quantity than auxiliary data. The auxiliary data are modest in quantity compared with audio data and, unlike ATRAC data, are not strictly subject to real-time constraints although the data are sometimes reproduced in synchronism with audio data playback.

Overall, the IEEE 1394 interface of this embodiment requires that audio data be transmitted and received by the isochronous communication method over an IEEE 1394 bus and that auxiliary data be exchanged by the asynchronous communication method over the same bus. With this embodiment, it is possible for the. IEEE 1394 interface either to send audio data and auxiliary data separately, or to transmit both audio and auxiliary data using isochronous cycles on a time division basis, i.e., in an apparently simultaneous manner as will be described later.

What follows is a description of the embodiment carrying out communications in compliance with the IEEE 1394 criteria.

2-2. Stack Model

Figure 5:
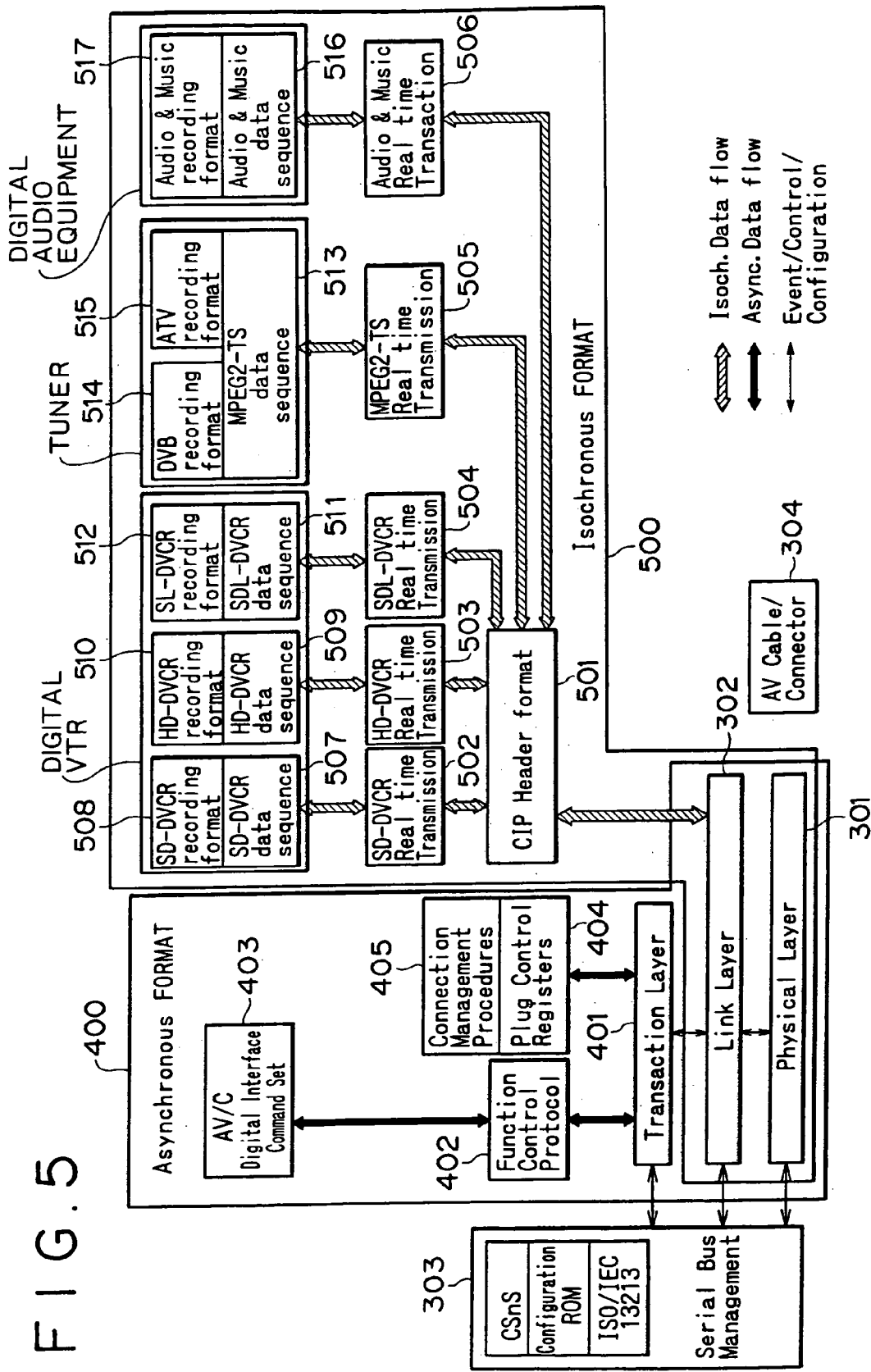
FIG. 5 is a structural view of a layer stack model in an IEEE 1394 format.

FIG. 5 shows a stack model of the IEEE 1394 as implemented in this embodiment. The IEEE 1394 format comes in two types: asynchronous format (400) and isochronous format (500). Common to both the asynchronous format (400) and the isochronous format (500) is the lowest layer called a physical layer (301) above which is a link layer (302). The physical layer (301) takes care of signal transmission on a hardware basis. The link layer (302) has functions for converting an IEEE 1394 bus illustratively to an internal bus specific to a given device.

The physical layer (301), the link layer (302), and a transaction layer (401) to be described below, are linked to serial bus management 303 by event/control/configuration lines. An AV cable/connector 304 represents physical connectors and cables needed for AV data transmission.

For the asynchronous format (400), the transaction layer (401) comes on top of the link layer (302). The transaction layer (401) defines data transmission protocols of the IEEE 1394. As basic asynchronous transactions, the transaction layer (401) designates a write transaction, a read transaction and a lock transaction.

The transaction layer (401) is topped by an FCP (Function Control Protocol)(402). The FCP (402) executes command control over various AV devices by use of control commands defined as AV/C commands (AV/C Digital Interface Command Set)(403).

Above the transaction layer (401) are plug control registers (404) for establishing plugs (logical device connections under the IEEE 1394, to be described later) using connection management procedures (405).

In the isochronous format (500), a CIP (Common Isochronous Packet) header format (501) comes above the link layer (302). Under management of the CIP header format (501), there are stipulated such transmission protocols as SD (standard density)-DVCR (Digital Video Camera Recorder) Real time Transmission (502), HD (High Density)-DVCR Real time Transmission (503), SDL (Standard Density Long)-DVCR Real time Transmission (504), MPEG2 (Moving Picture Coding Experts Group 2)-TS (Transport Stream) Real time Transmission (505), and Audio and Music Real time Transmission (506).

The SD-DVCR Real time Transmission (502), HD-DVCR Real time Transmission (503), and SDL-DVCR Real time Transmission (504) are data transmission protocols that address digital VTRs (Video Tape Recorders).

Data to be handled by the SD-DVCR Real time Transmission (502) are a data sequence (SD-DVCR data sequence (507)) acquired in accordance with an SD-DVCR recording format (508).

Data to be manipulated by the HD-DVCR Real time Transmission (503) are a data sequence (SD-DVCR data sequence (509)) obtained in keeping with an HD-DVCR recording format (510).

Data to be dealt with by the SDL-DVCR Real time Transmission (504) are a data sequence (SD-DVCR data sequence (511)) gained as per an SDL-DVCR recording format (512).

The MPEG2-TS Real time Transmission (505) is a transmission protocol that addresses illustratively tuners for digital broadcasts via satellite. Data to be handled by this protocol are a data sequence (MPEG2-TS data sequence (513)) acquired in compliance with a DVB (Digital Video Broadcast) recording format (514) or an ATV (Analog Television) recording format (515).

The Audio and Music Real time Transmission (506) is a transmission protocol that addresses a whole range of digital audio equipment including the MD system embodying this invention. Data to be dealt with by this protocol are a data sequence (Audio and Music data sequence) obtained in accordance with an audio and music recording format (517).

2-3. Forms of Signal Transmission

Figure 6:
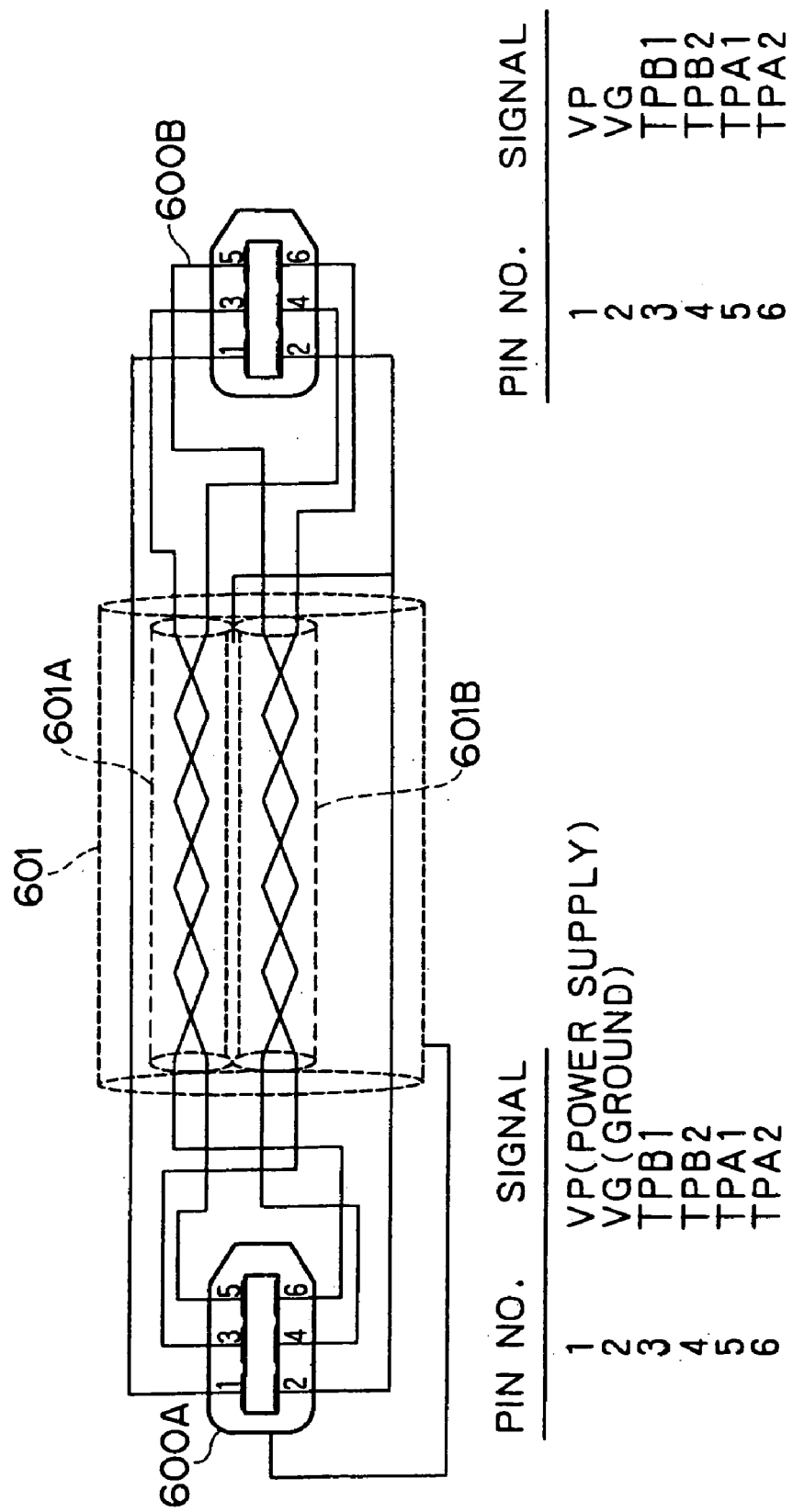
FIG. 6 is a structural view of an IEEE 1394 bus cable.

FIG. 6 depicts a typical structure of a cable actually used as an IEEE 1394 bus.

In FIG. 6, connectors 600A and 600B are connected via a cable 601. Pins numbered 1 through 6 are shown to be used as pin terminals attached to the connectors 600A and 600B.

Of the pin terminals on the connectors 600A and 600B, pin No. 1 corresponds to power supply (VP), pin No. 2 to ground (VG), pin No. 3 to TPB1, pin No. 4 to TPB2, pin No. 5 to TPA1, and pin No. 5 to TPA2.

The pins are interconnected between the connectors 600A and 600B as follows:
pin No. 1 (VP) to pin No. 1 (VP);
pin No. 2 (VG) to pin No. 2 (VG);
pin No. 3 (TPB1) to pin No. 5 (TPA1);
pin No. 4 (TPB2) to pin No. 6 (TPA2);
pin No. 5 (TPA1) to pin No. 3 (TPB1); and
pin No. 6 (TPA2) to pin No. 4 (TPB2).

Of the above pin connection pairs, two twisted-line pairs
pin No. 3 (TPB1) to pin No. 5 (TPA1) and
pin No. 4 (TPB2) to pin No. 6 (TPA2) constitute a signal line 601A for alternately transmitting signals on a differential basis. Furthermore, another two twisted-line pairs
pin No. 5 (TPA1) to pin No. 3 (TPB1) and
pin No. 6 (TPA2) to pin No. 4 (TPB2) form a signal line 601B for alternately transmitting signals also on a differential basis.

Figure 7:
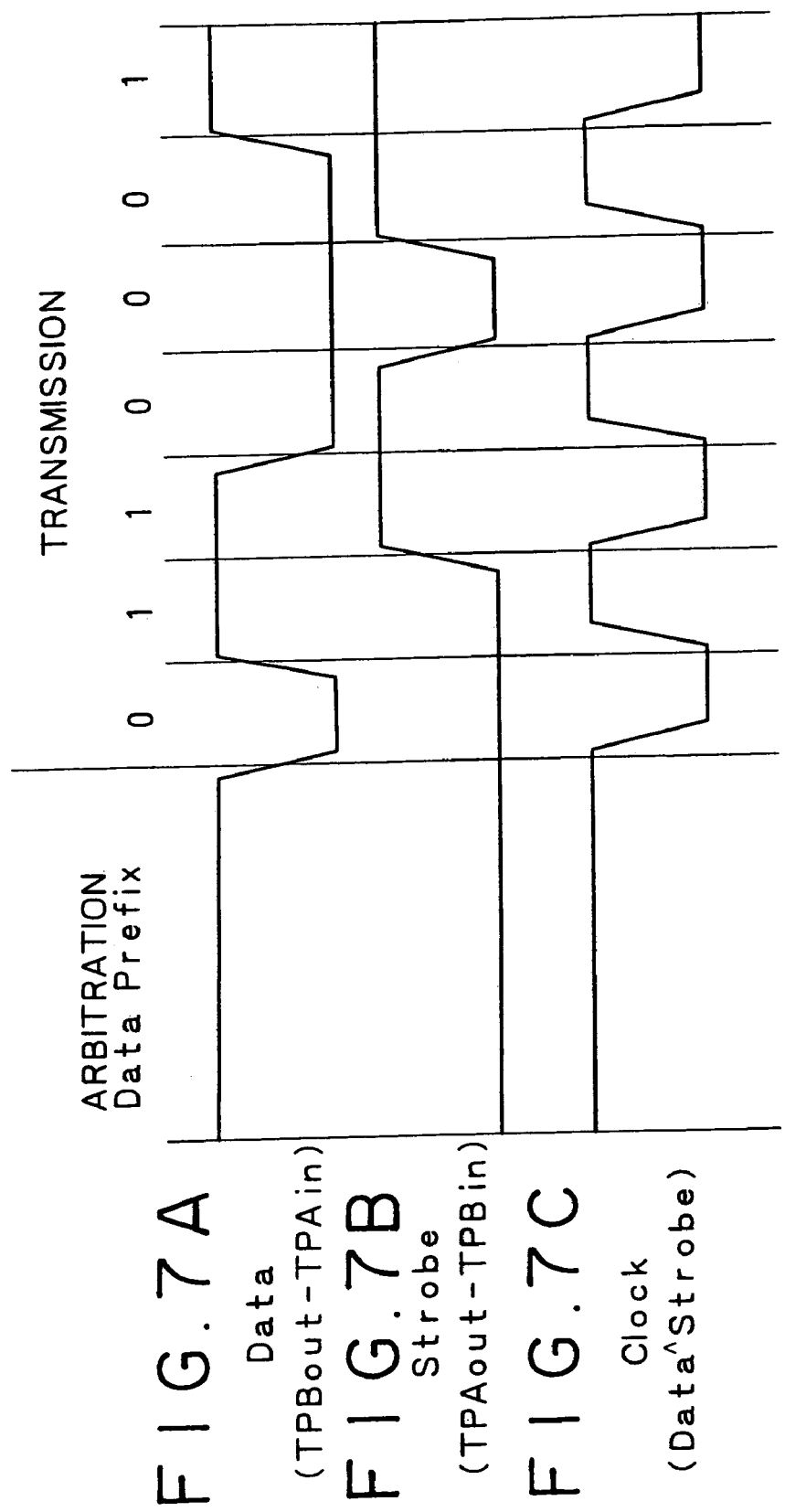
FIG. 7A is a timing chart of a DATA signal transmitted over an IEEE 1394 bus.
FIG. 7B is a timing chart of a STROBE signal transmitted over the IEEE 1394 bus.
FIG. 7C is a timing chart of a CLOCK signal transmitted over the IEEE 1394 bus.

The signals sent over the two signal lines 601A and 601B are a data signal (Data) shown in FIG. 7A and a strobe signal (Strobe) in FIG. 7B.

The data signal in FIG. 7A uses one of the signal lines 601A and 601B. This data signal is output through TPB1 and TPB2 and enters TPA1 and TPA2.

The strobe signal in FIG. 7B is obtained by performing a predetermined logic operation on the data signal and on a transmission clock synchronized with this data signal. For that reason, the strobe signal has a frequency lower than that of the actual transmission clock. The strobe signal uses either of the signal lines 601A and 601B that is not occupied for data signal transmission. Following propagation over the signal line, the strobe signal is output through TPA1 and TPA2 to enter TPB1 and TPB2.

Suppose that the data signal of FIG. 7A and strobe signal of FIG. 7B are input to a device complying with the IEEE 1394. In that case, the device carries out the appropriate logic operation on the input data signal and strobe signal to generate a transmission clock (Clock) shown in FIG. 7C. The transmission clock thus generated is used for necessary input data signal processing.

By adopting such hardware-based data transmission forms, the IEEE 1394 format eliminates the need for transferring a rapid-cycle transmission clock over cables between configured devices. This enhances the reliability of signal transmission.

Although the six-pin arrangement has been described above, this is not limitative of the invention. Alternatively, the IEEE 1394 format may omit the power supply (VP) and ground (VG) to form a four-pin arrangement consisting of two twisted-line pairs, i.e., signal lines 601A and 601B only. The MD recorder/player 1 of the embodiment may illustratively utilize such a four-pin cable arrangement to provide users with a more simplified system than ever.

2-4. Bus Connection between Devices

Figure 8:
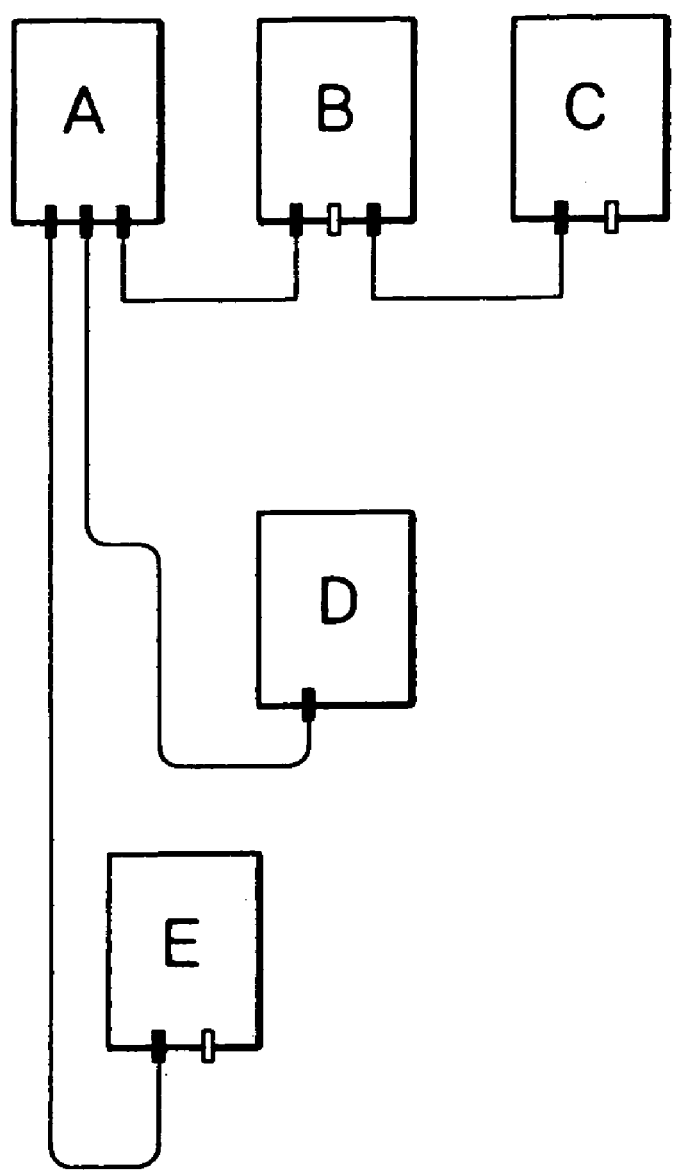
FIG. 8 is a schematic view of devices connected by an IEEE 1394 bus.

FIG. 8 illustrates schematically how devices are typically interconnected by use of IEEE 1394 buses. The setup of FIG. 8 shows five devices A through E (nodes) being connected for intercommunication via the IEEE 1394 buses.

The IEEE 1394 interface is capable of what is known as daisy-chain connection whereby apparatuses such as the devices A, B and C in FIG. 8 are serially connected through the IEEE 1394 buses. The interface also permits so-called branch connection whereby an apparatus is connected in parallel with multiple apparatuses, as in the setup of FIG. 8 in which the device A is connected parallelly with the devices B, D and E.

The system as a whole is allowed to have up to 63 devices (nodes) configured through both branch connection and daisy-chain connection. Used alone, the daisy-chain connection permits a configuration of up to 16 devices (16 pop). Terminators needed for the SCSI (Small Computer System Interface) are not necessary for the IEEE 1394 interface.

The IEEE 1394 interface allows the devices connected by such daisy-chain connection or branch connection to communicate with one another. In the setup of FIG. 8, the devices A, B, C, D and E are allowed to communicate with one another.

Within the system where a plurality of devices are connected by IEEE 1394 buses (the system is also called the IEEE 1394 system hereunder), each of the configured devices is assigned a node-ID in practice. The process of node-ID assignment is shown schematically in FIGS. 9A, 9B and 9C.

Figure 9A:
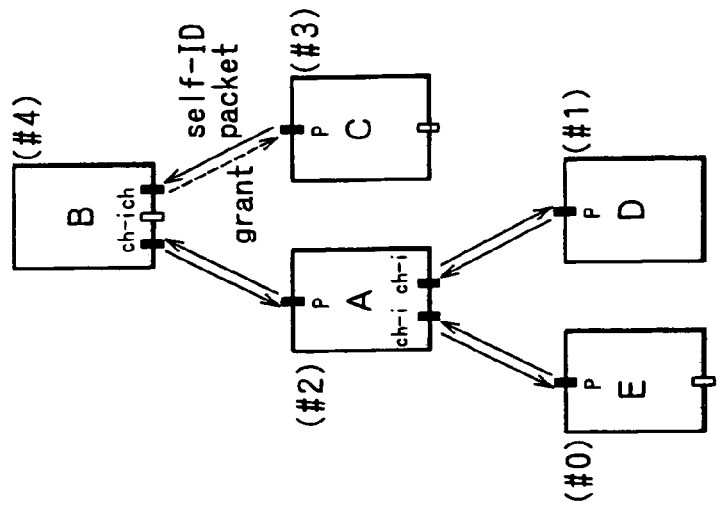
FIG. 9A is a transition diagram explaining how a bus reset notice is transmitted upon generation of a bus reset.

In an IEEE 1394 system whose connection setup is shown in FIG. 9A, a bus reset is generated if a cable is connected or disconnected, if any one of the configured devices of the system is turned on or off, or if a spontaneous process takes place under PHY (Physical Layer Protocol). In such a case, a bus reset notice is sent to all devices A, B, C, D and E over the IEEE 1394 buses.

Figure 9B:
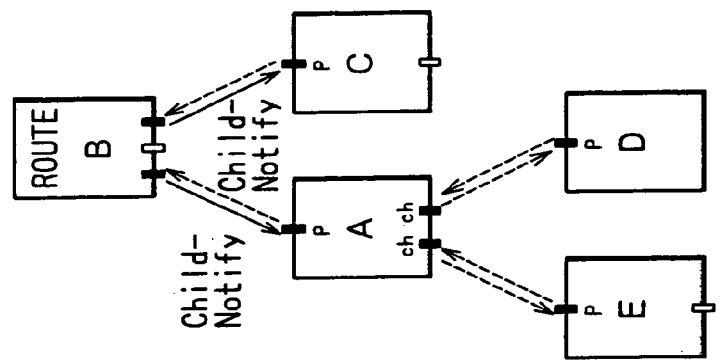
FIG. 9B is a transition diagram showing how parent-child (ren) relations are defined between devices after a bus reset.
Figure 9C:
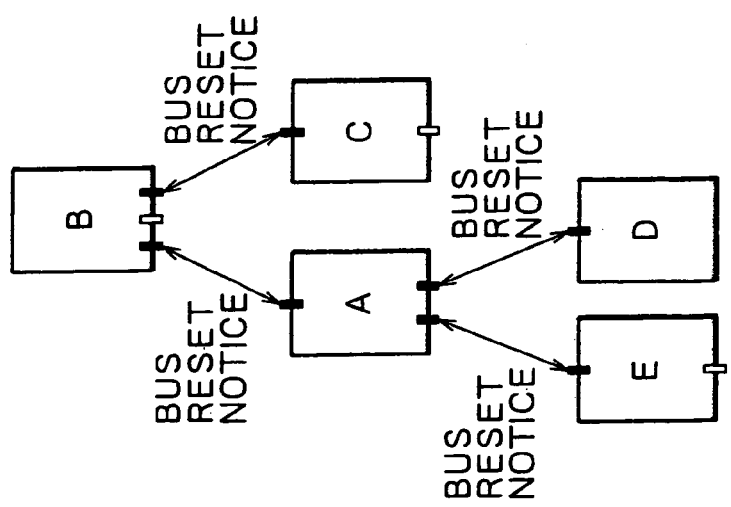
FIG. 9C is a transition diagram depicting how Node_IDs of devices are determined.

The bus reset notice triggers communications (called Child-Notify) that result in defining parent-child relations between adjacent devices as depicted in FIG. 9B. That is, a tree structure of the configured devices is built within the IEEE 1394 system. With the tree structure established, the device constituting a root of the tree is defined. The root is a device whose terminals are all defined as "children" (Ch). In the setup of FIG. 9B, the device B is defined as the root. In other words, a terminal of the device connected to the device B as the root is defined as a "parent" (P).

When the tree structure and its root have been defined in the IEEE 1394 system as described above, each device then outputs a self-ID packet as a declaration of its own node-ID. The root grants one node-ID after another to the connected devices, whereby addresses (node-IDs) of the devices constituting the IEEE 1394 system are determined.

2-5. Packets

Figure 10:
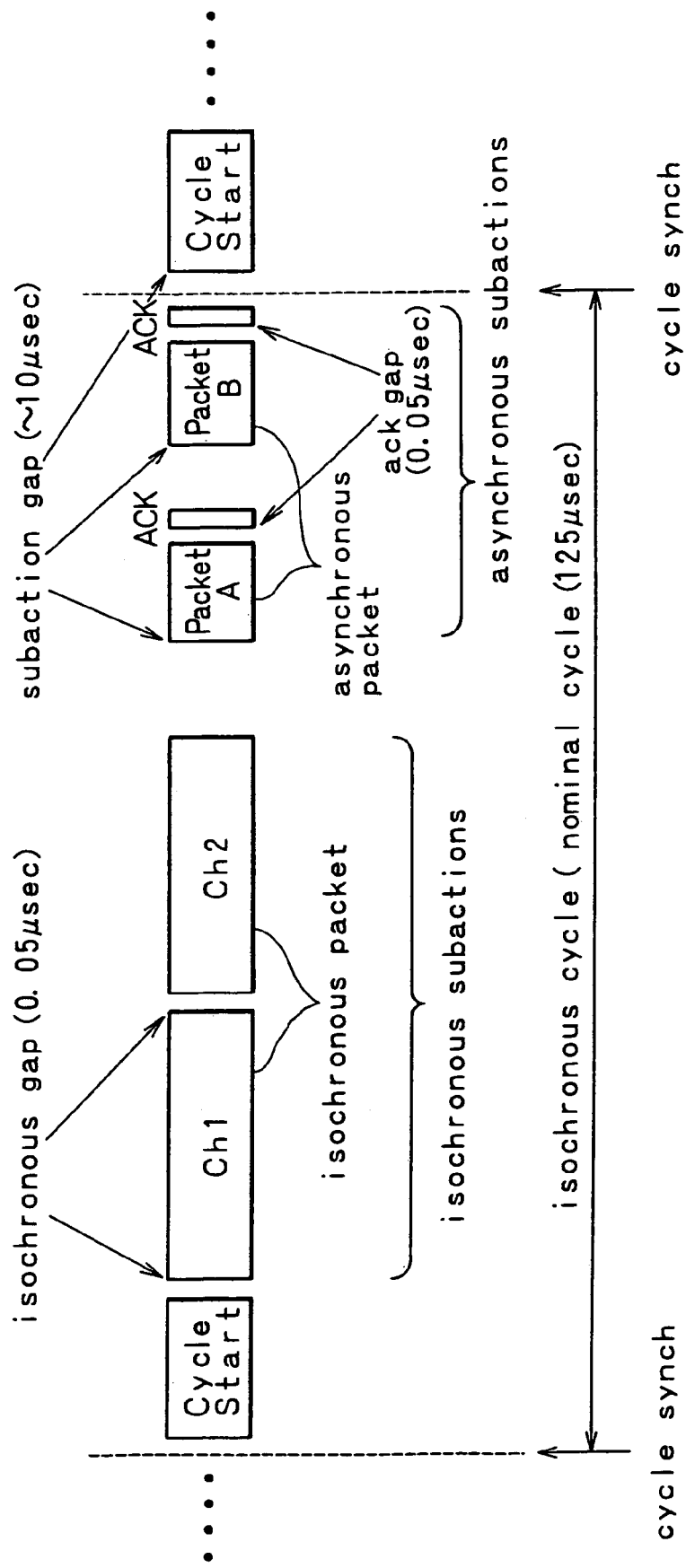
FIG. 10 is a schematic view of a cycle structure in an IEEE 1394 format.

As shown in FIG. 10, the IEEE 1394 format effects data transmission through repeated isochronous cycles (nominal cycles). It is stipulated that each isochronous cycle lasts 125 μsec on a frequency band of 100 MHz. It is also stipulated that the isochronous cycle may have a duration period other than 125 μsec. For transmission, data are turned into packets in each isochronous cycle.

As illustrated in FIG. 10, each isochronous cycle is headed by a cycle start packet indicating the beginning of the cycle. When to generate cycle start packets is designated by a device defined as a cycle master in the IEEE 1394 system. Details of the cycle start packet generation will not be described further.

Each cycle start packet is followed preferentially by isochronous packets. As shown in FIG. 10, the isochronous packets correspond to a channel each and are transferred on a time division basis (in the form of isochronous subactions). In isochronous subactions, the packets are set apart by intervals called isochronous gaps (each lasting illustratively 0.05 μsec).

As described, the IEEE 1394 system allows isochronous data to be transmitted and received over a single transmission line on a multi-channel basis.

Suppose that compressed audio data (called ATRAC data hereunder) compatible with the MD recorder/player of this embodiment are transmitted by the isochronous method. In that case, if ATRAC data are subject to a single-speed transfer rate of 1.4 Mbps, then time series continuity (i.e., real-time characteristic) is guaranteed by transmitting the data in isochronous packets of 20-odd megabytes per 125-μsec isochronous cycle.

For example, before transmitting ATRAC data, a device requests an IRM (Isochronous Resource Manager) in the IEEE 1394 system to grant an isochronous packet size large enough to ensure real-time transmission of the ATRAC data. In response, the IRM grants or withholds permission for the packet size by monitoring the current data transmission status. If permission is granted, the ATRAC data in question are transmitted in isochronous packets over specific channels. This procedure, of which details will not be described further, is called band reservation for the IEEE 1394 interface.

Frequency ranges not used for isochronous subactions over the isochronous cycle band are utilized for asynchronous subactions, i.e., for asynchronous transmission of packets.

FIG. 10 shows an example in which two asynchronous packets A and B are transmitted. The asynchronous packets are each followed by an ACK (acknowledge) signal, with an interval called an ack gap (0.05 μsec long) interposed therebetween. An ACK signal is output by the receiving side (i.e., target) on a hardware basis informing the transmitting side (i.e., controller) that some asynchronous data have been received during an asynchronous transaction, as will be described later.

An interval called a subaction gap about 10 μsec is placed before and after each data transmission unit made of an asynchronous packet and an ACK signal.

Where arrangements are made to transmit ATRAC data in isochronous packets and to send auxiliary data files accompanying the ATRAC data in asynchronous packets, it is possible to transmit both the ATRAC data and the auxiliary data files in an apparently simultaneous fashion.

2-6. Transaction Rules

Figure 11:
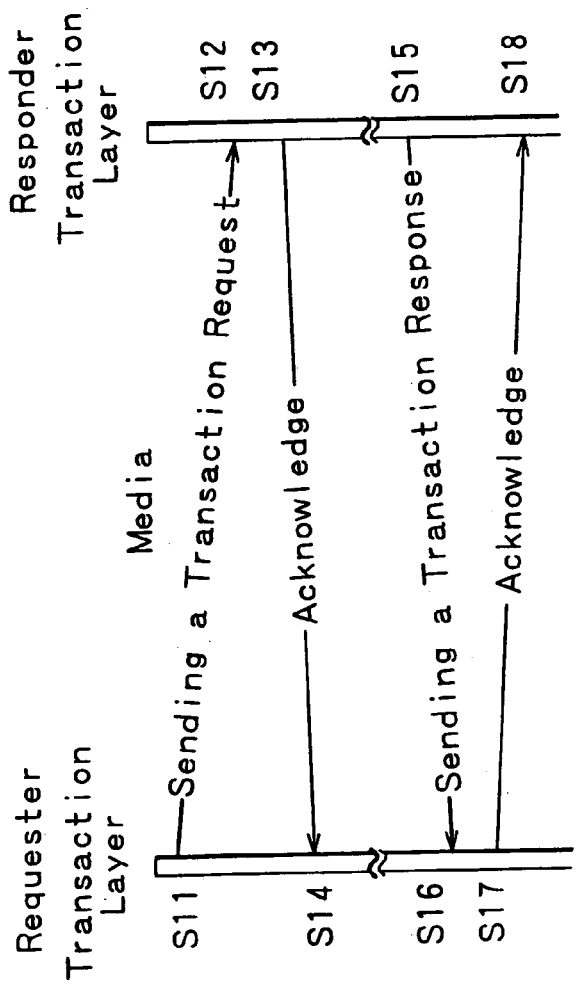
FIG. 11A is a transition diagram showing basic transaction rules on asynchronous communication.
FIG. 11B is a table listing contents of transmitted transaction requests.

FIG. 11A is a process transition diagram showing basic transaction rules for asynchronous communication. The transaction rules are stipulated in compliance with the FCP.

As depicted in FIG. 11A, a requester (transmitting side) first sends a request to a responder (receiving side) in step S11. On receiving the request (in step S12), the responder sends an acknowledgement back to the requester (in step S13). When receiving the acknowledgement, the requester confirms that the request has been accepted by the responder (in step S14).

In turn, the responder sends a transaction response to the request from the requester (in step S15). Upon receipt of the response (in step S16), the requester returns an acknowledgement to the responder (in step S17). When receiving the acknowledgement, the responder verifies that its response has been received by the requester.

Request transactions transmitted in FIG. 11A fall into three categories: write requests, read requests, and lock requests, as listed in the left-hand part of the table in FIG. 11B.

Write requests are commands that designate data write operations. Read requests are commands that specify data read operations. Lock requests, though not discussed hereunder in detail, are commands for swap, compare, and mask operations.

The write requests are further grouped by the data size of the command (operand) in an asynchronous packet (AV/C command packet, to be described later with reference to figures) into three types. One write request type is a write request (data quadlet) for sending a command according to the header size alone in an asynchronous packet. The other two write request types are a write request (data block: data length=4 bytes) and a write request (data block: data length≠4 bytes) Each of the latter two write request types supplements a header of an asynchronous packet with a data block for command transmission. What makes the two write request types different from each other is that the data size of the operand placed in the data block is four bytes for one request type and something other than four bytes for the other.

As with the write requests, the read requests are further grouped by the data size of the operand in an asynchronous packet into three types: a read request (data quadlet), a read request (data block: data length=4 bytes), and a read request (data block: data length≠4 bytes).

Response transactions are listed in the right-hand part of the table in FIG. 11B. Either a write response or no response is defined as corresponding to any of the three write request types.

A read response (data quadlet) is defined as corresponding to the read request (data quadlet), and a read response (data block) as corresponding to the read request (data block: data length=4 bytes) or to the read request (data block: data length≠4 bytes).

A lock response is defined as corresponding to the lock request.

2-7. Addressing

Figure 12:
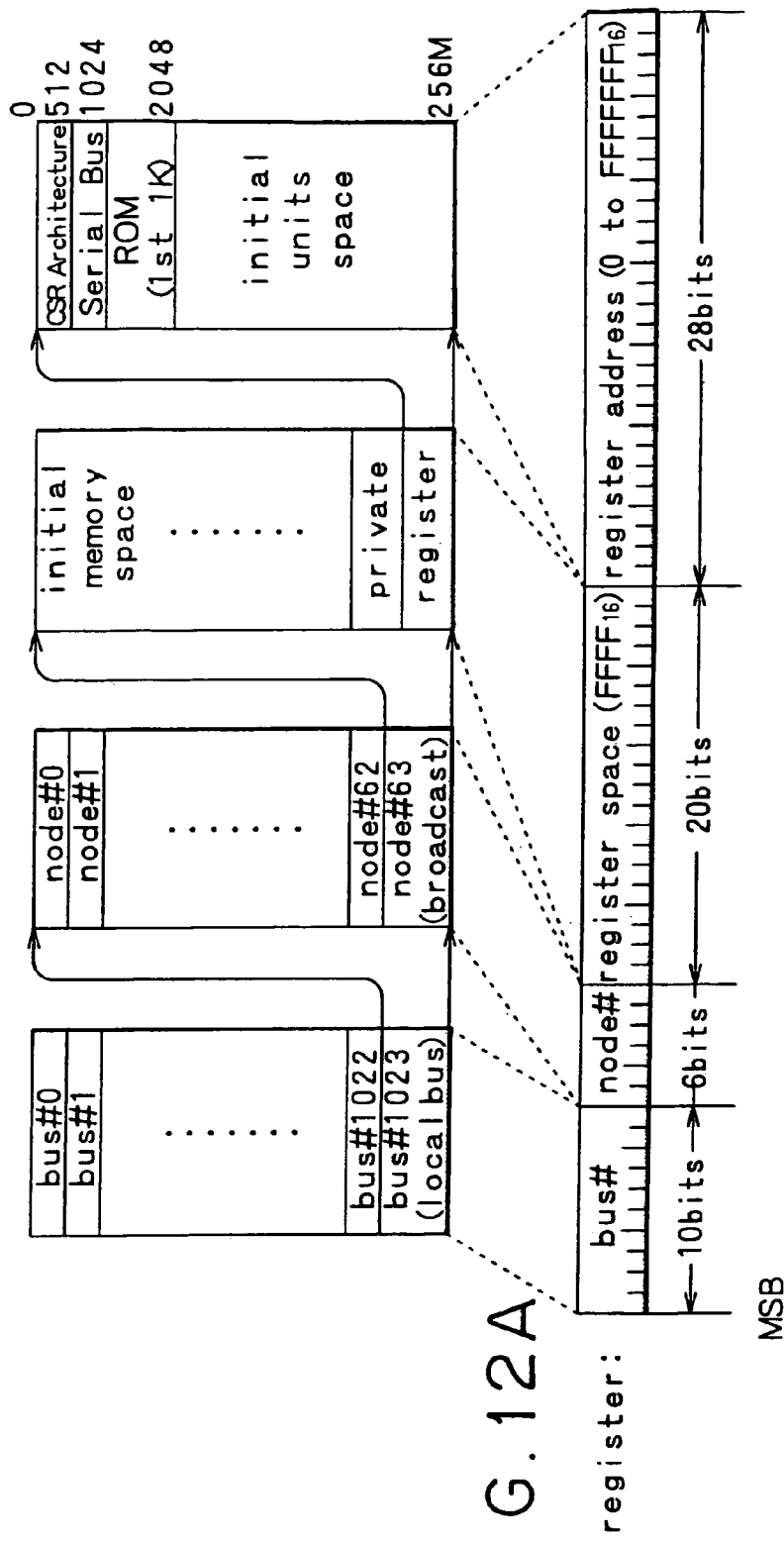
FIG. 12A is a schematic view of a data structure in a bus address register for an IEEE 1394 bus.
FIG. 12B is a schematic view of a data structure of bus IDs for identifying IEEE 1394 buses.
FIG. 12C is a schematic view of a data structure of Node_IDs assigned to devices connected to an IEEE 1394 bus arrangement.
FIG. 12D is a schematic view of a register space data structure for an IEEE 1394 bus.
FIG. 12E is a schematic view of a register address data structure for an IEEE 1394 bus.

FIG. 12A through 12E show addressing structures of IEEE 1394 buses. As depicted in FIG. 12A, a 64-bit bus address register (address space) is provided in the IEEE 1394 format.

A high-order 10-bit region of the register designates a bus ID for identifying an IEEE 1394 bus. As shown in FIG. 12B, the region permits setting of up to 1,023 bus IDs for buses Nos. 0 through 1,022. Bus No. 1,023 is defined as a local bus.

A six-bit region following the bus address in FIG. 12A designates a Node_ID of a device connected to the IEEE 1394 bus identified by the bus ID. As depicted in FIG. 12C, the Node_ID permits identification by up to 63 Node_IDs numbered 0 through 62.

The 16-bit region comprising the bus ID and Node_ID above corresponds to a destination ID in a header of an AV/C command packet, to be described later. In the IEEE 1394 system, each device connected to a specific bus is identified by the bus ID and Node_ID.

A 20-bit region following the Node_ID in FIG. 12A constitutes a register space. The register space is followed by a 28-bit register address.

The register space has a value [F FF FFh] indicating the register shown in FIG. 12D. The content of this register is defined as depicted in FIG. 12E. The register address designates the address of the register shown in FIG. 12E.

In brief, addressing works as follows: information about an isochronous cycle time and free channels is obtained by referring to serial bus-dependent registers starting illustratively from address 512 [0 00 02 00h] in the register of FIG. 12E.

A reference to the content of a configuration ROM starting from address 1,024 [0 00 04 00h] permits recognition of a node type and a node-unique ID specific to that node type.

2-8. CIP

Figure 13:
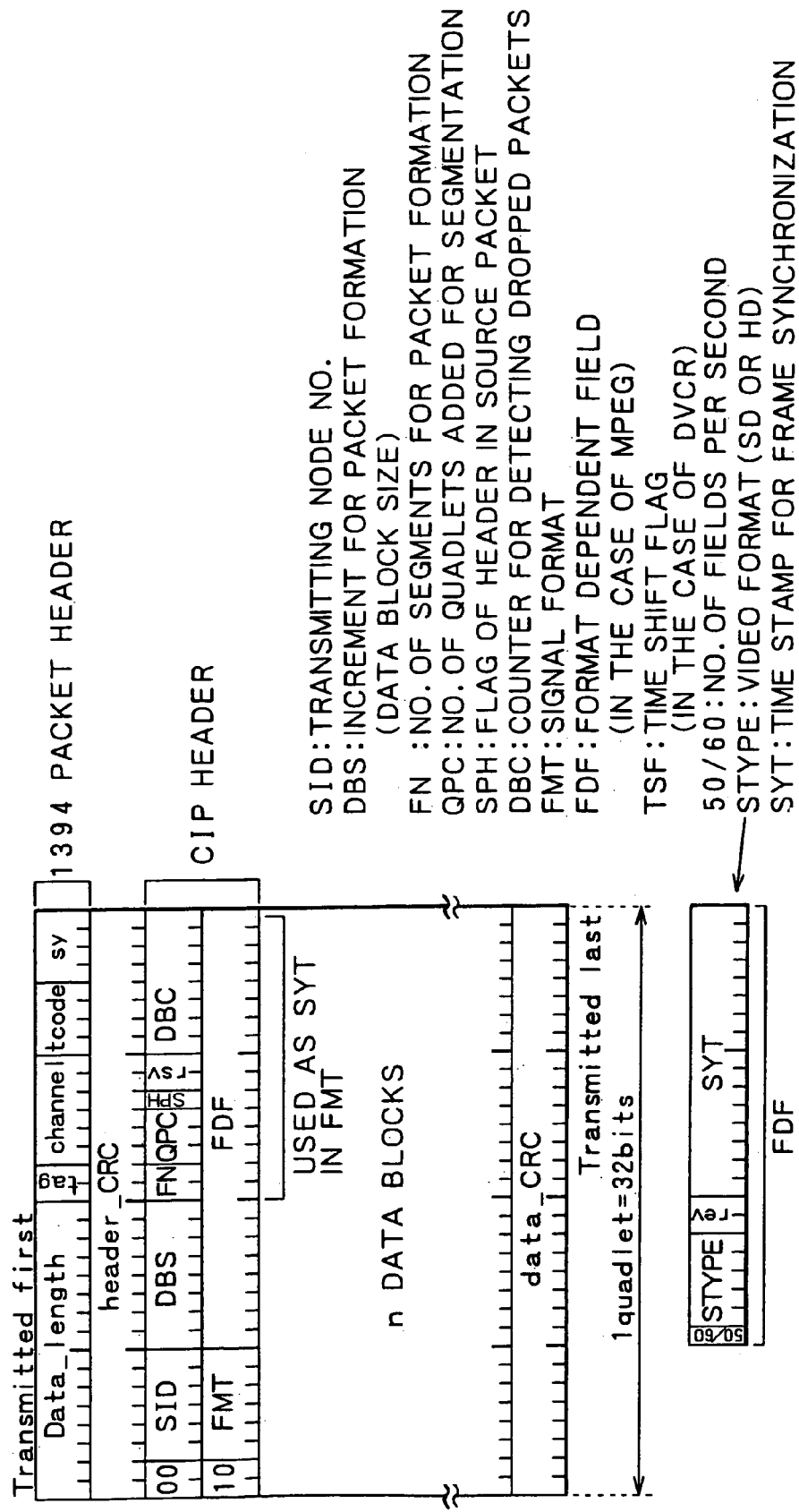
FIG. 13 is a schematic view of a CIP structure.

FIG. 13 illustrates a structure of a CIP (common isochronous packet). This is a data structure of the isochronous packet shown in FIG. 10. In IEEE 1394-compatible communications, as mentioned above, ATRAC data (one type of audio data to be recorded and reproduced by the MD recorder/player of this embodiment) are transmitted and received by the isochronbus method. That is, quantities of data sufficient to maintain the real-time characteristic are carried by isochronous packets that are transmitted one after another in isochronous cycles.

The first 32 bits (making up a quadlet) of the CIP constitute a 1394 packet header. In this packet header, a high-order 16-bit region indicates a Data_length followed by a two-bit region that designates a tag. The tag is followed by a six-bit region designating a channel. The channel region is followed by a four-bit designating "tcode" which in turn is followed by a four-bit "sy" code. A quadlet region following the 1394 packet header contains a header_CRC.

A two-quadlet region following the header_CRC constitutes a CIP header. In the high-order quadlet of the CIP header, the most significant two bits are each filled with a "0". A six-bit region after the "00" bits indicates an SID (transmitting node number), followed by an eight-bit region designating a DBS (data block size, i.e., increment of data for packet formation). The DBS region is followed by an FN (of two bits) and a QPC (of three bits) region. The FN region denotes the number of segments for packet formation, and the QPC region represents the number of quadlets added for segmentation.

The QPC region is followed by an SPH (of one bit) region that indicates a flag of the header in a source packet. A DBC region contains a value of a counter for detecting dropped packets.

High-order two bits in the low-order quadlet of the CIP header are each filled with a "0". The "00" bits are followed by an FMT (of six bits) and an FDF (of 24 bits) region. The FMT region denotes a signal format whose value permits identification of a type of data (i.e., data format) placed in this CIP. More specifically, such data types as MPEG stream data, audio stream data, and digital video camera (DV) stream data may be identified by the FMT region. The data format given in the FMT region corresponds illustratively to a transmission protocol such as the SD-DVCR Real time Transmission (502), HD-DVCR Real time Transmission (503), SDL-DVCR Real time Transmission (504), MPEG2-TS Real time Transmission (505), or Audio and Music Real time Transmission (506) under management of the CIP header format (501) shown in FIG. 5.

The FDF region is a format-dependent field designating a more detailed category of the data format classified by the FMT region. Illustratively, audio data may be identified in more detail as linear audio data or MIDI data.

For example, ATRAC data for use with this embodiment are first indicated as data falling under the category of audio stream data in the FMT region. With a predetermined value set to the FDF region, the audio stream data are further shown to be ATRAC data.

If the FMT region indicates MPEG data, then the FDF region holds synchronization control information called a TSF (time shift flag). If the FMT region denotes DVCR (digital video camera) data, the FDF region is defined as shown in the lower part of FIG. 13. This FDF region has a high-order 50/60 region (of one bit) designating the number of fields per seconds, followed by an STYPE region (of five bits) indicating whether the video format is SD or HD. The STYPE region is followed by an SYT region that provides a time stamp for frame synchronization.

Following the CIP header, the data indicated by the FMT and FDF regions are stored in a sequence of "n" data blocks. If the data are shown to be ATRAC data by the FMT and FDF regions, the data blocks contain the ATRAC data. The data blocks are terminated by a data CRC region.

2-9. Connection Management

In the IEEE 1394 format, logical connections called "plugs" are used to define connective relations between devices connected by IEEE 1394 buses.

Figure 14:
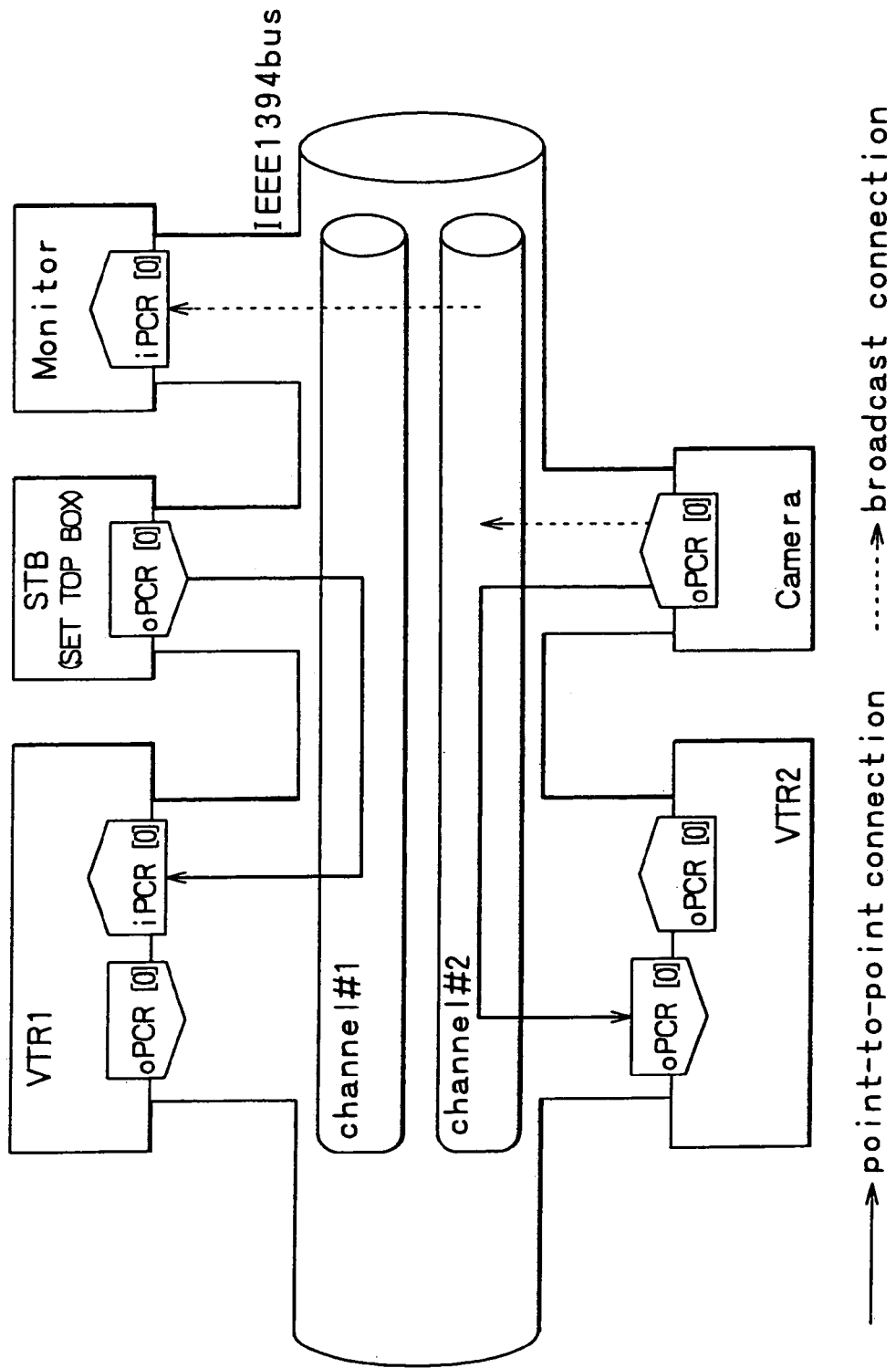
FIG. 14 is a schematic view of typical connective relations determined by plugs.

FIG. 14 shows a typical setup of connective relations defined by plugs. The setup constitutes a system having VTR1, VTR2, a set-top box (STB; digital satellite broadcast tuner), a monitor, and a digital still camera all connected via an IEEE 1394 bus.

There are two forms of plug-based IEEE 1394 connections: point-to-point connection, and broadcast connection.

The point-to-point connection specifies relations between a transmitting device and a receiving device. Data transmission takes place over a specific channel from the transmitting device to the receiving device.

On the other hand, the broadcast connection permits data transmission without requiring the transmitting device to specify receiving devices and channels to be utilized. The receiving devices receive the transmitted data without identifying the transmitting device and perform predetermined processes if so required by the content of the received data.

The setup of FIG. 14 shows two point-to-point connection states: one in which the STB send data and the VTR1 receives the data over channel No. 1, and the other in which the digital still camera sends data and the VTR2 receives the data over channel No. 2.

Also shown in FIG. 14 is a broadcast connection state for the digital still camera to transmit its data on a broadcasting basis. The broadcast data are shown being received by the monitor which in turn performs a predetermined response process.

The above connections (plugs) are established by a PCR (plug control register) included in an address space of each device configured.

FIG. 15A depicts a structure of a plug control register for output (oPCR[n]), and FIG. 15B indicates a structure of a plug control register for input (iPCR[n]). The registers oPCR[n] and iPCR[n] have a size of 32 bits each.

In the register oPCR of FIG. 15A, illustratively a "1" set to the most significant bit (on-line) indicates data transmission by broadcast connection; a "0" shows that data are transmitted by point-to-point connection over a channel whose channel number is set in a six-bit channel number region starting from the 11th bit relative to the MSB.

In the register iPCR of FIG. 15B, illustratively a "1" set to the most significant bit (on-line) indicates data reception by broadcast connection; a "0" shows that data are received by point-to-point connection over a channel whose channel number is set in a six-bit channel number region starting from the 11th bit relative to the MSB.

2-10. Commands and Responses under FCP

In the IEEE 1394 format for this embodiment, auxiliary data (picture files and text files based on JPEG and recorded and reproduced by the MD recorder/player) are transmitted and received by the asynchronous method.

With this embodiment, transmission of auxiliary data by the asynchronous method is regulated under the FCP (402) shown in FIG. 5. Below is a description of a transaction for the transmission governed by the FCP.

A write transaction (see FIG. 11B) prescribed for the asynchronous method is used under the FCP. Auxiliary data are transmitted by this embodiment by utilizing write transactions for asynchronous communication in keeping with the FCP.

Each of the devices that support the FCP comprises a command/response register. A write transaction is implemented by writing a message to the command/response register as will be explained below with reference to FIG. 16.

Figure 16:
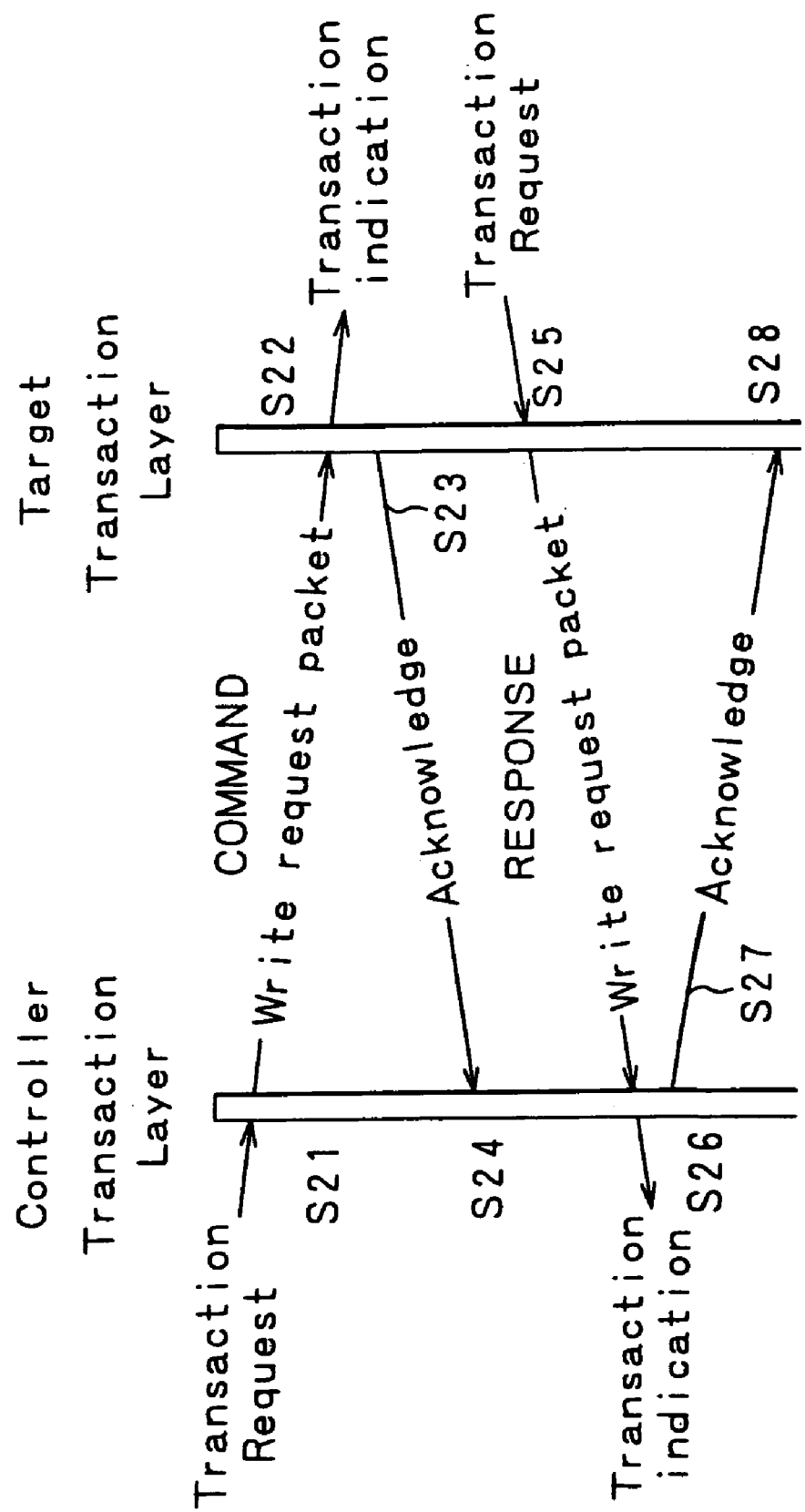
FIG. 16 is a process transition diagram in effect when messages are written to command/response registers.

FIG. 16 shows a process transition diagram wherein in step S21 a controller generates a transaction request and sends a write request packet to a target for a command transmission. In step S22, the target receives the write request packet and writes data to the command/response register. The target returns an acknowledgement to the controller in step S23, and the controller receives the acknowledgement in step S24. The steps so far constitute a command transmission process.

In a process responding to the command, the target transmits a write request packet (in step S25). On receiving the write request packet, the controller writes data to the command/response register (in step S26). With the write request packet received, the controller also transmits an acknowledgement to the target (in step S27). Receiving the acknowledgement allows the target to confirm that the write request packet has been received by the controller (in step S28).

That is, data transmission (transactions) according to the FCP is based on two processes: the process of command transmission from the controller to the target, and the process of response transmission from the target to the controller.

2-11. AV/C Command Packet

As described earlier in reference to FIG. 5, the FCP allows various AV devices to communicate by the asynchronous method using AV/C commands.

Three kinds of transactions, i.e., write, read and lock, are prescribed for asynchronous communication, as explained with reference to FIG. 11B. In practice, a write request/response packet, a read request/response packet, and a lock request/response packet are used in keeping with the different transactions. For the FCP, the write transaction is employed as described above.

Figure 17:
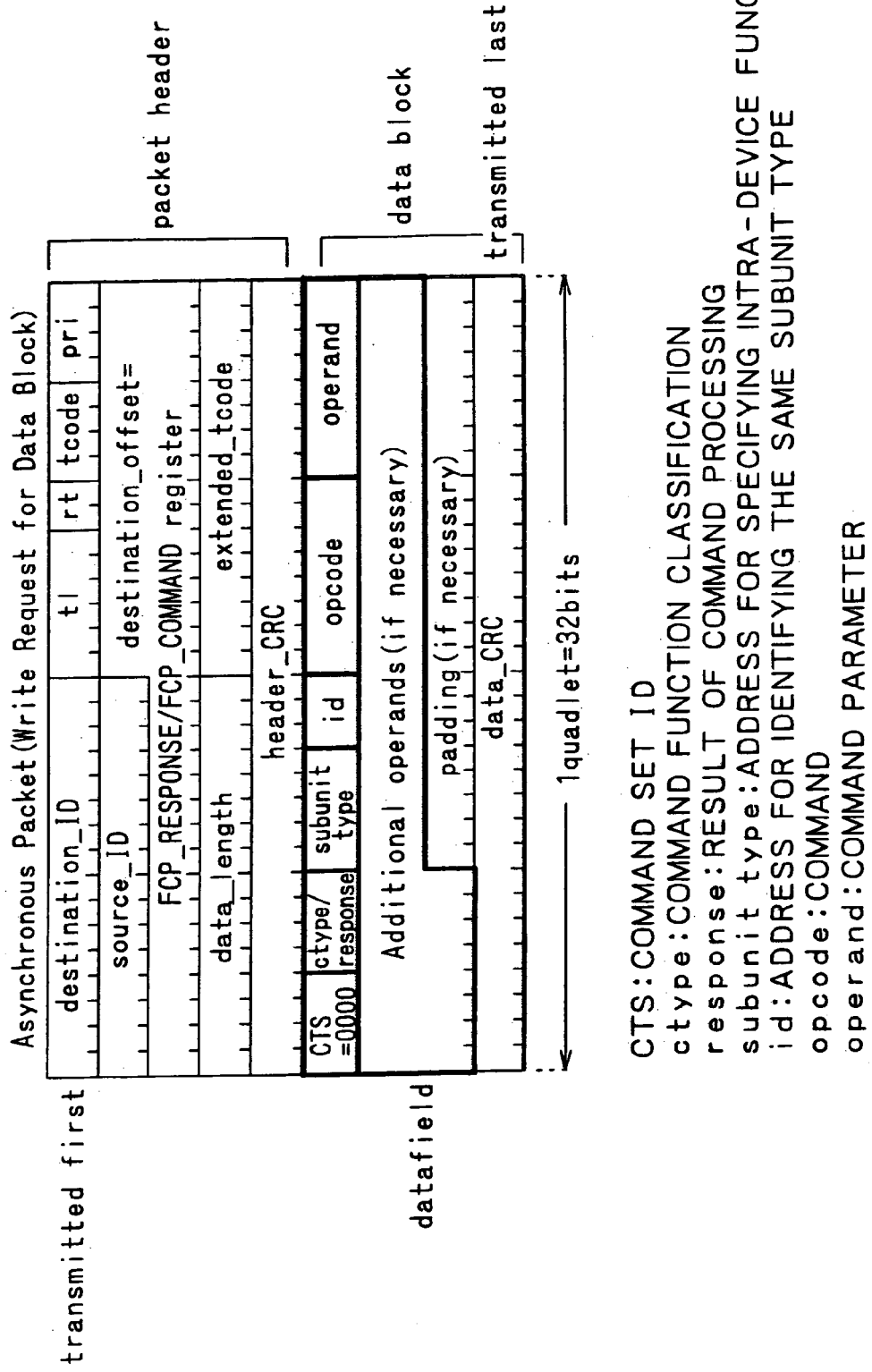
FIG. 17 is a schematic view of a data structure in an asynchronous packet.

FIG. 17 shows a format of a write request packet (asynchronous packet (Write Request for Data Block)). This embodiment uses the write request packet as its AV/C command packet.

High-order five quadlets (i.e., the first through the fifth quadlets) in the write request packet constitute a packet header. A high-order 16-bit region in the first quadlet of the packet header denotes a destination_ID, i.e., an ID of a node serving as a data transfer destination. The destination ID region is followed by a six-bit "tl" (transact label) region representing a packet number. The six-bit region is followed by a two-bit "rt" (retry code) region indicating whether the packet in question is the initially transmitted packet or a retransmitted packet. The "rt" region is followed by a four-bit "tcode" (transaction code) region designating a command code. The "tcode" region is followed by a four-bit "pri" (priority) region indicating the priority of the packet.

A high-order 16-bit region in the second quadlet of the packet header denotes a source_ID, i.e., an ID of a node serving as a data transfer source.

A low-order 16-bit region in the second quadlet and the entire third quadlet, occupying a total of 48 bits, designate a destination_offset indicating two addresses: one for a command register (FCP_COMMAND register), and the other for a response register (FCP_RESPONSE register).

The destination_ID and destination_offset correspond to the 64-bit address space stipulated in the IEEE 1394 format.

A high-order 16-bit region in the fourth quadlet contains a data_length. This region designates the data size of a datafield, to be described later (shown enclosed by thick lines in FIG. 17). The data_length region is followed by an extended_tcode region used when the tcode is extended.

A 32-bit region making up the fifth quadlet indicates a header_CRC. This region contains a CRC-computed value to checksum the packet header.

Data blocks are arranged starting from the sixth quadlet following the packet header. A datafield is formed at the beginning of data blocks.

High-order four bytes forming the datafield heading the sixth quadlet describes a CTS (command and transaction set). The CTS region indicates an ID of a command set for the write request packet in question. For example, a CTS value of "0000" as shown in FIG. 17 defines the content of the datafield as an AV/C command. In other words, the write request packet is identified as an AV/C command packet. Thus with this embodiment, the CTS region is filled with "0000" to let the FCP use AV/C commands.

A four-bit region following the CTS has a response written therein indicating the result (i.e., response) of a process corresponding to a "ctype" (command type, i.e., a command function classification) or to a command.

FIG. 18 lists definitions of the command types (ctype) and responses mentioned above. Values [0000] through [0111] are defined for use as "ctype" (commands). Specifically, the value [0000] is defined as CONTROL, [0001] as STATUS, [0010] as INQUIRY, and [0011] as NOTIFY. Values [0100] through [0111] are currently undefined (reserved).

CONTROL is a command used to control functions externally; STATUS is a command for inquiring status from the outside; INQUIRY is a command utilized to inquire externally the presence or absence of support for control commands; and NOTIFY is a command employed to request that an external entity be notified of status change.

Values [1000] through [1111] are defined for use as responses. Specifically, the value [1000] is defined as NOT IMPLEMENTED; [1001] as ACCEPTED; [1010] as REJECTED; [1011] as IN TRANSITION; [1100] as IMPLEMENTED/STABLE; [1101] as CHANGED; [1110] as reserved; and [1111] as INTERIM.

The responses above are used selectively depending on the command type. For example, one of four responses NOT IMPLEMENTED, ACCEPTED, REJECTED and INTERIM is employed selectively depending on the status of the responder.

In FIG. 17, the ctype/response region is followed by a five-bit region that contains a subunit_type. The subunit type designates a subunit (device) that serves as a destination of command transmission or as a source of response transmission. In the IEEE 1394 format, each device is called a unit and a functional unit within the unit is called a subunit. Illustratively, a typical VTR as a unit comprises two subunits: a tuner for receiving terrestrial and satellite broadcasts, and a video cassette recorder/player.

Subunit types are defined illustratively as shown in FIG. 19A. Specifically, a value [00000] is defined as a monitor while [00001] through [00010] are reserved. A value [00011] is defined as a disc recorder/player, [00100] as a VCR, [00101] as a tuner, [00111] as a camera, and [01000] through [11110] are reserved. A value [11111] is defined as a unit for use where no subunit exists.

In FIG. 17, a three-bit region following the subunit type region contains an "id" (Node_ID) for identifying a subunit if there exist a plurality of subunits of the same type.

An eight-bit region following the "id" (Node_ID) region contains an opcode which in turn is followed by an operand. The opcode stands for an operation code. The operand contains information (parameter) needed by the opcode. Opcodes are defined for each subunit in an opcode list table specific to the subunit in question. Illustratively, if the subunit is a VCR, diverse commands such as PLAY (playback) and RECORD (recording) are defined for the subunit. An operand is defined for each opcode.

A 32-bit region constituting the sixth quadlet in FIG. 17 is a mandatory datafield. If necessary, operands may be added after this datafield (shown as additional operands).

The datafield is followed by a data_CRC region. Padding may be placed before the data_CRC region where necessary.

2-12. Plugs

Described below is general information about plugs in the IEEE 1394 format. As described above with reference to FIGS. 15A and 15B, plugs represent logical connections between devices in keeping with the IEEE 1394 format.

Figure 20:
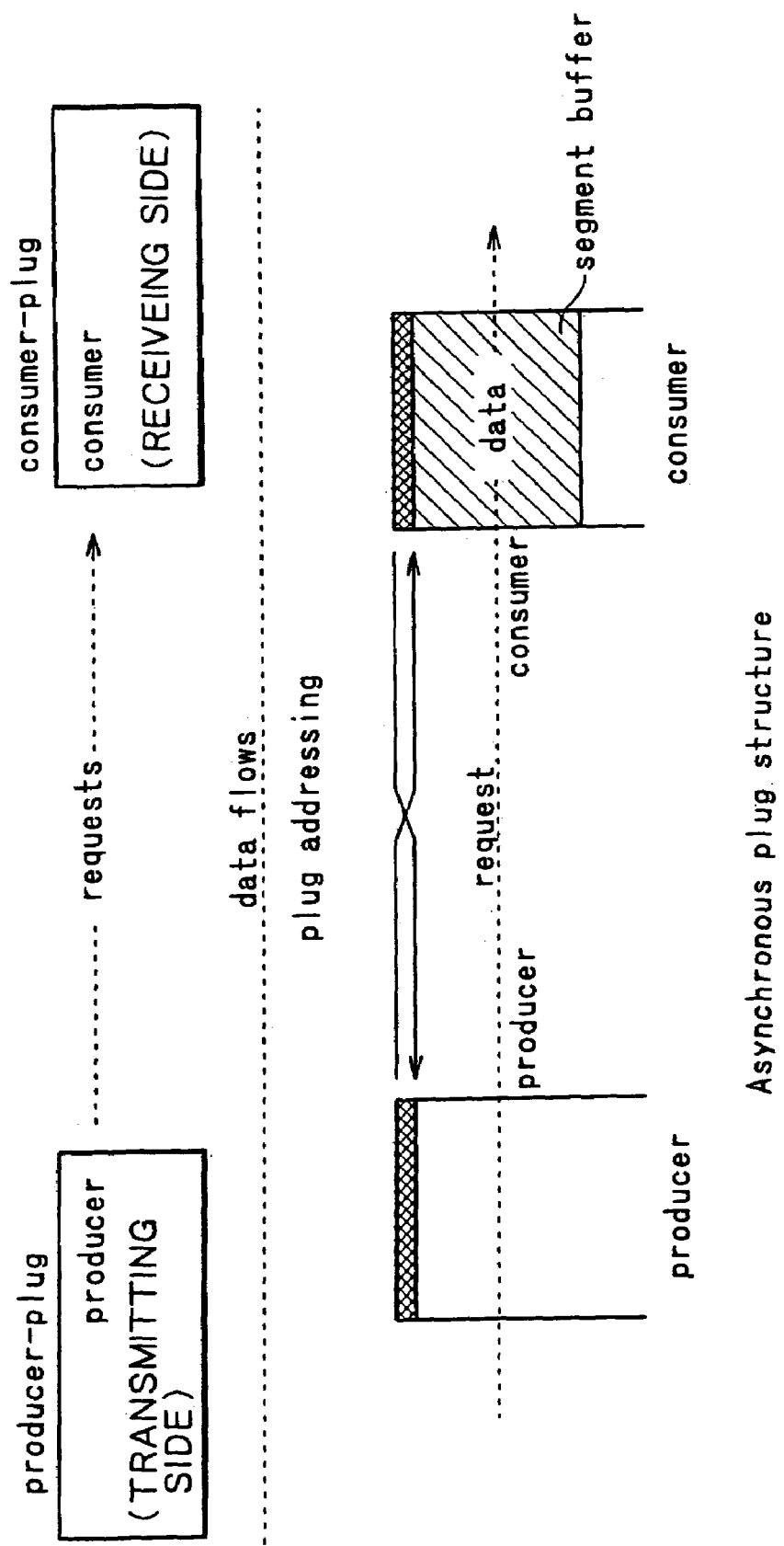
FIG. 20 is an explanatory view of an asynchronous plug structure.

Data such as commands (requests) effective in asynchronous communication are sent from a producer to a consumer, as illustrated in FIG. 20. The producer stands for a device acting as a transmitter and the consumer denotes a device serving as a receiver in accordance with the IEEE 1394 interface. The consumer has a segment buffer, shown shaded in FIG. 20, which accommodates data written by the producer.

In the IEEE 1394 system, information for designating specific devices as the producer and consumer (the information is called Connection Management Information) is retained at predetermined plug address locations indicated by braided lines in FIG. 20. The segment buffer is located following the plug address.

The range of segment buffer addresses to which the consumer may write data (the range thus denotes a recordable data quantity) is prescribed by a limit count register managed on the consumer side, as will be described later.

Figures 21A, 21B, 21C:
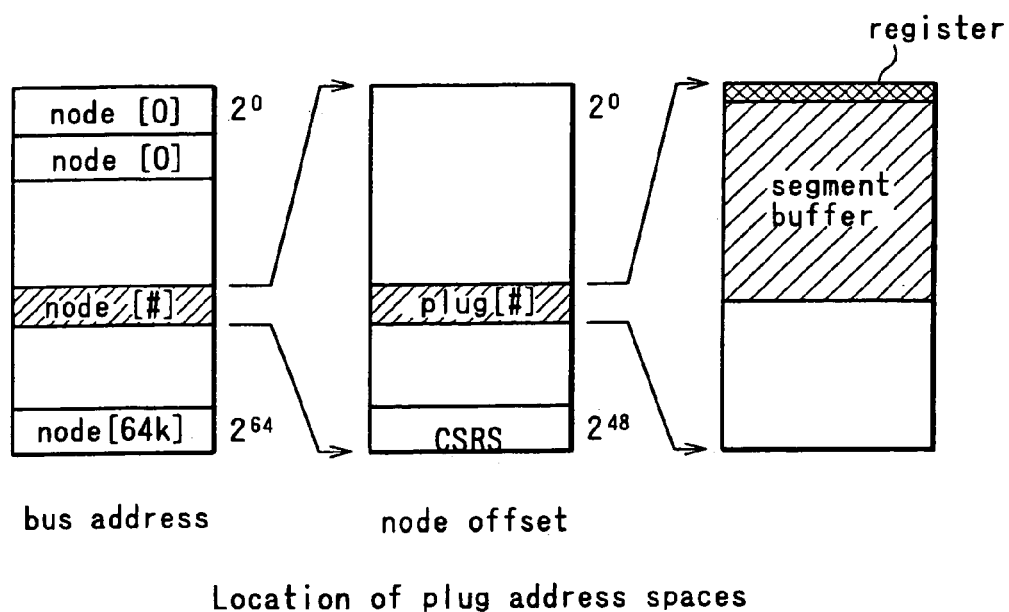
FIG. 21A is a view of a data structure in connection with locations of plug address spaces.
FIG. 21B is a view of a node offset data structure with regard to locations of plug address spaces.
FIG. 21C is a view of a plug data structure associated with locations of plug address spaces.

FIGS. 21A, 21B and 21C depict a structure of plug address spaces for asynchronous communication. A 64-bit plug address space is divided as shown in FIG. 21A into as many as 216 (64K) nodes, in such a manner that a plug is found in the address space of each node as depicted in FIG. 21B. Each plug includes a register indicated by braided lines and a segment buffer shown shaded as illustrated in FIG. 21C. The register accommodates information (e.g., transmitted data size and receivable data size) necessary for exchanging data between the transmitting side (producer) and the receiving side (consumer), as will be explained later. The segment buffer is an area to which to write the data sent from the producer to the consumer. It is stipulated illustratively that a minimum segment buffer size is 64 bytes.

FIG. 22A shows a typical plug address whose content is the same as that in FIG. 21C. As shown in FIG. 22A, a plug address is headed by the register which is followed by the segment buffer.

An internal structure of the register, as indicated in FIG. 22B, is headed by a 32-bit producer count register followed by limit count registers [1] through [14] of 32 bits in size each. That is, one producer count register and 14 limit count registers make up the register. In this structure, an unused region comes behind the limit count register [14].

The plug structure illustrated in FIGS. 22A and 22B is designated by offset addresses shown in FIG. 22C. Offset address 0 specifies a consumer port (producer count register) while offset addresses 4, 8, 12 through 56, and 60 designate producer ports [1] through [14]. Offset address 64 designates a segment buffer.

FIGS. 23A and 23B show plug structures for both the producer and the consumer. With such plug structures in effect, asynchronous communication is implemented by writing data to the producer count register, to the limit count registers and to the segment buffer in keeping with data exchange procedures which will be described later. The write operations fall under the category of the write transaction described above.

The producer writes data to the producer count register of the consumer. More specifically, the producer first writes information about data transmission on the producer side to the producer count register at an address specific to the producer. The content of the producer count register is then written to the producer count register on the consumer side.

The producer count register accommodates the size of data to be written in a single write operation by the producer to the segment buffer of the consumer. That is, the producer that writes data to the producer count register performs a process of reporting the size of data to be written to the consumer segment buffer.

In response, the consumer writes data to the limit count registers of the producer. More specifically, the consumer first writes the size of its segment buffer to one of the limit count registers 1 through 14 (register [n]) which is designated corresponding to the producer. The content of the limit count register [n] is then written to the limit count register [n] of the producer.

In accordance with the data written to its limit count register [n], the producer determines the size of data to be written in a single write operation illustratively to its own segment buffer. The content of the segment buffer is in turn written to the segment buffer of the consumer. The write operation to the consumer segment buffer constitutes a data transmission of asynchronous communication.

2-13. Asynchronous Connection Transmission Procedures

Figure 24:
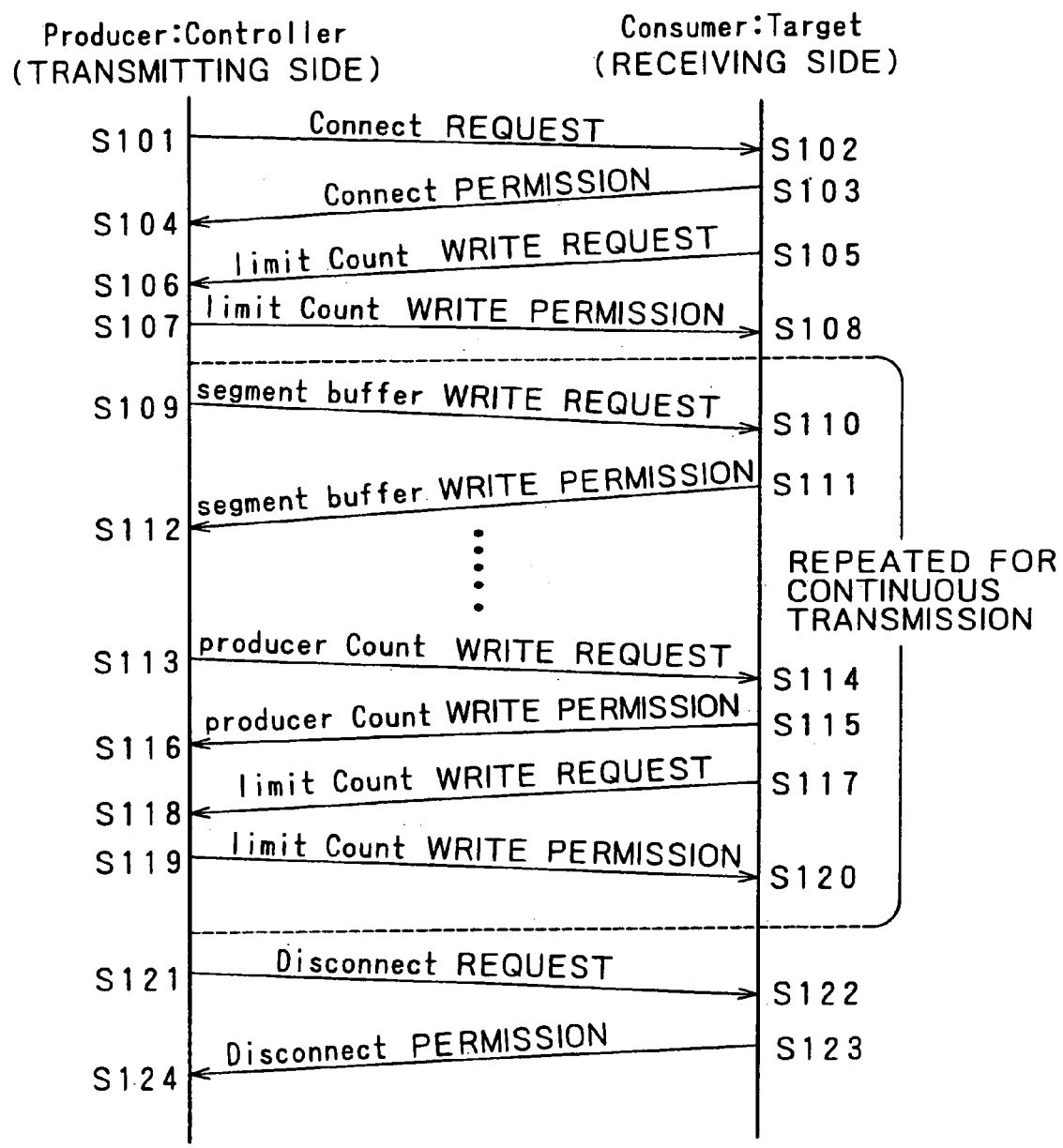
FIG. 24 is a transition diagram of command transactions between a producer and a consumer.

Described below with reference to a process transition diagram in FIG. 24 are basic procedures for transmission and reception by asynchronous connection where the inter-plug (i.e., producer-consumer) structure of FIGS. 23A and 23B is assumed to be established.

The transmission and reception procedures shown in FIG. 24 are implemented using AV/C commands (write request packets) in an environment stipulated by the FCP for asynchronous communication. Auxiliary data handled by this embodiment are transmitted and received by use of the procedures within the IEEE 1394 system. It should be noted that the processing shown in FIGS. 23A and 23B indicates only communicating operations by means of asynchronous connection, a communication process addressing the recording and playback of auxiliary data will be described later.

In an actual asynchronous connection setup, acknowledgements are sent and received following command transmissions as shown in FIG. 16. The setup of FIG. 24 omits illustration of acknowledgement exchanges for purpose of simplification.

For the IEEE 1394 interface, inter-plug (i.e., device-to-device) connective relations include controller-target relations in addition to the above-described producer-consumer relations. In the IEEE 1394 system, the devices established in producer-consumer relations may or may not coincide with the devices that are arranged in controller-target relations. In other words, there may exist a device stipulated to offer controller functions in addition to the devices designated as producers. In this example, however, it is assumed that the producer-consumer relations coincide with the controller-target relations.

In step S101 in the transmission procedures of FIG. 24, a producer transmits a connect request to a consumer. The connect request is a command sent by the producer to the consumer for requesting a connection therebetween. The command informs the consumer of a register address of the producer.

The connect request is received by the consumer in step S102, whereupon the consumer recognizes the address of the register on the producer side. In step S103, the consumer transmits in response a connect permission to the producer. Upon receipt of the connect permission by the producer in step S104, a connection is established between the producer and the consumer for subsequent data transmission and reception thereby.

With the connection set up as described above, the consumer transmits a limit count register (abbreviated to the limit count hereunder) write request to the producer in step S105. After receiving the limit count write request in step 8106, the producer transmits a limit count write permission to the consumer in step S107. In step S108, the consumer receives the limit count write permission. The sending of the limit count write request followed by the write permission is a process that determines the size of data to be written later to the segment buffer (i.e., segment buffer size).

In step S109, the producer transmits a segment buffer write request to the consumer. The segment buffer write request is received by the consumer in step S110. In response, the consumer transmits a segment buffer write permission to the producer in step S111. The producer receives the segment buffer write permission in step S112.

Carrying out steps S109 through S112 completes a single process of writing data from the segment buffer of the producer to the segment buffer of the consumer.

In steps S109 through S112, the data are written by transmission of a single asynchronous packet shown in FIG. 10. If the data size transferred in an asynchronous packet is less than the data size designated by the limit count register and if the transmission of the necessary data is not complete using the single asynchronous packet, then steps S109 through S112 are repeated until the segment buffer capacity is full.

When the write operation to the segment buffer is completed in steps S109 through S112, step S113 is carried out in which the producer transmits a producer count register (abbreviated to the producer count hereunder) write request to the consumer. The consumer receives the producer count write request in step S114 and performs a write operation to its producer count register. In step S115, the consumer transmits a producer count write permission to the producer. The producer receives the producer count write permission in step S116.

The process above notifies the consumer of the data size transferred in steps S109 through S112 from the producer to the consumer segment buffer.

In step S117, a process is initiated to perform a limit count write operation following the producer count write process made up of steps S113 through S116. Specifically, as shown in steps S117 through S120, a limit count write request is transmitted from the consumer to the producer. In response, the producer transmits a limit count write permission to the consumer.

Steps S109 through S120 above constitute a single set of procedures for data transmission by asynchronous connection. If the size of data to be transmitted is greater than the segment buffer size and if the transmission of the data is not complete in a series of steps S109 through S120, then steps S109 through S120 are repeated until the data transmission is completed.

When the data transmission is completed, the producer in step S121 transmits a disconnect request to the consumer. The consumer receives the disconnect request in step S122, and transmits a disconnect permission in step S123. The producer receives the disconnect permission in step S124, which completes the data transmission and reception by asynchronous connection.

2-14. Reserve Commands

Reserve commands are defined as an interface of AV/C commands according to the above-described IEEE 1394 data interface requirements.

If a device acting as a controller transmits a reserve command to a device serving as a target and if the target accepts the reserve command, then the target enters a reserve mode in which only commands (requests) from the controller that has sent the reserve command are accepted and commands from any other device are rejected.

With the reserve mode thus established, only the controller having issued the reserve command executes remote control on the device serving as the target. No other controller can exercise remote control over the target.

Reserving the device functioning as the target averts possible conflict of processing between a single target and a plurality of controllers attempting to exercise remote control concurrently on the target. This feature, as mentioned earlier, has been proposed by this applicant in PCT Application No. PCT/JP99/06411.

Figure 25:
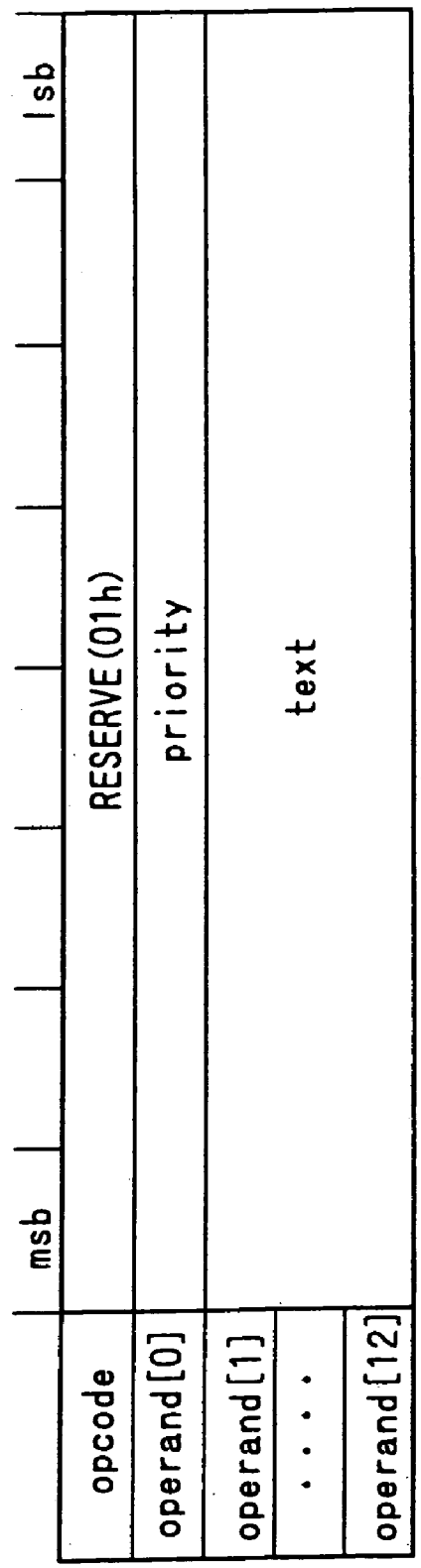
FIG. 25 is a view of a data structure in a normal reserve control command.

FIG. 25 shows a data structure of a reserve control command. A controller transmits the reserve control command to a target in making a reserve request to the latter.

The reserve control command shown in FIG. 25 is placed following the opcode in the datafield of a write request packet (AV/C command packet) illustrated in FIG. 17.

A value "01h" ("h" stands for hexadecimal notation) is set to the eight-bit opcode region. The value identifies a reserve command.

An operand [0] (of 1 byte) following the value "01h" contains a value designating the priority of reservation. The larger the priority value, the higher the priority. The target being reserved retains a priority value. If any other controller subsequently sends a reserve request (i.e., transmits a reserve command), the target compares its currently held priority value with the priority value in the newly transmitted reserve command to check whether to accept or reject the reserve request. A target not reserved has a priority value of 0.

Each one-byte region in the operands [1] through [12] constitutes a text region capable of accommodating up to 12 bytes of text information in ASCII code. If there is no need to store text in the regions of the operands [1] through [12], they are filled with FFh.

Figure 26:
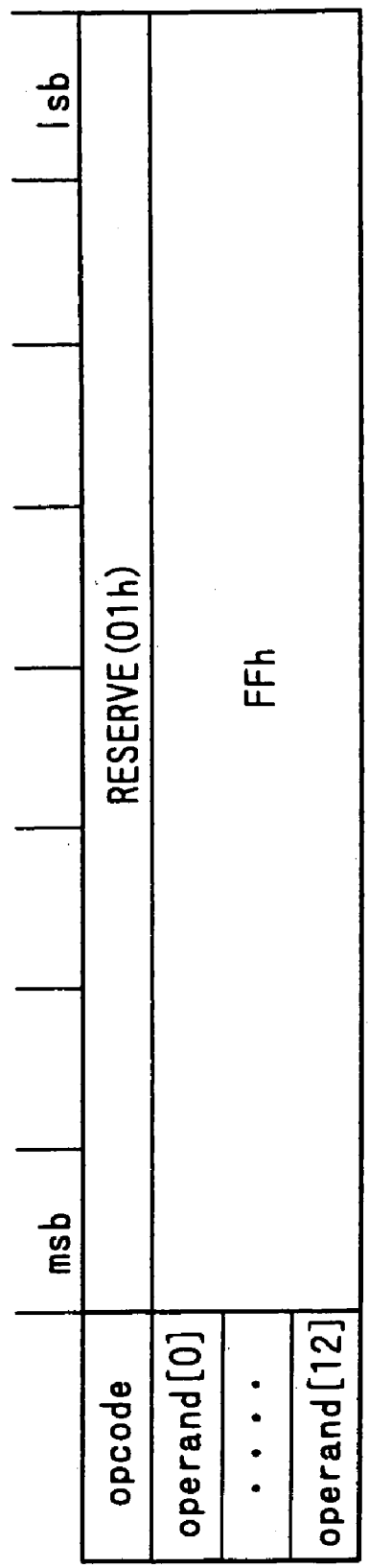
FIG. 26 is a view of a data structure in a normal reserve status command.

FIG. 26 depicts a data structure of a reserve status command as another reserve command.

The reserve status command is used to check the currently established priority in a reserved (as well as unreserved) device. Suppose that there are two controllers A and B and that a target is being reserved by the controller A at priority 5. In that case, if the controller B attempts to reserve the same target using a reserve control command at priority 1, the reserve request will be rejected.

The rejection of the request is circumvented by the controller B which, upon reserving the target, initially transmits a reserve status command thereto before sending a reserve control command. The reserve status command prompts the target to report its current priority to the controller B.

The reserve status command shown in FIG. 26 is positioned following the opcode in the datafield of a write request packet (AV/C command packet) in FIG. 17.

In this case, too, the value "01h" ("h" stands for hexadecimal notation) is set to the eight-bit opcode region. The value identifies a reserve command.

However, because it is not necessary for the reserve status command to specify priority, no region is provided to accommodate a priority value. The regions of the operands [0] through [12] are thus filled with FFh.

2-15. Background of This Invention

For this embodiment of the invention, the reserve commands are defined as described above. It has been found that rules prescribing the reserve commands can lead to certain inconveniences, as will be described below with reference to FIGS. 27 and 28.

Figure 27:
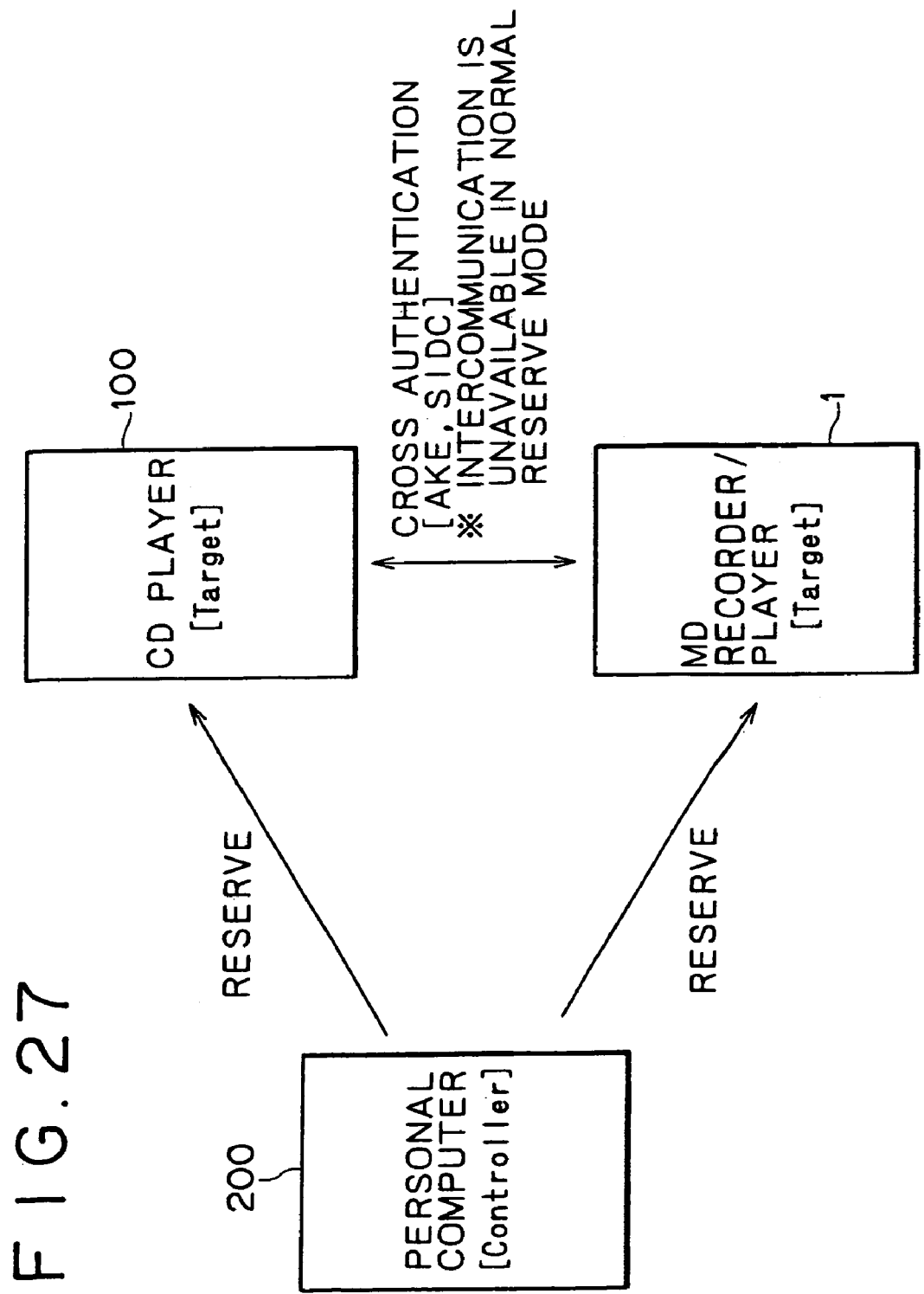
FIG. 27 is a block diagram of a controller device and target devices reserved by the controller device, the devices being interconnected by an IEEE 1394 bus arrangement.

FIG. 27 shows controlling relations in an IEEE 1394 bus setup among the personal computer 200, CD player 100, and MD recorder/player 1 included in FIG. 1.

In this setup, it is assumed that the personal computer 200 acts as a controller while the CD player 100 and MD recorder/player 1 serve as targets. It is also assumed that the personal computer 200 has reserved both the CD player 100 and the MD recorder/player 1.

Suppose that under remote control of the personal computer 200 as part of an IEEE 1394 system, audio data reproduced by the CD player 100 are recorded to the MD recorder/player 1 in what is generally known as dubbing.

During dubbing between digital audio devices, so-called copy management is usually effected to protect copyrights because digital signals involved keep the quality of recorded sound uncorrupted. In the system shown in FIG. 1, copy management information called AKE (Authentication and Key Exchange) is referenced to perform intercommunication between the playback device and the recording device for authentication.

For example, the MD recorder/player 1 sends to the CD player 100 an AKE challenge command requesting authentication (AKE) of the data currently reproduced from the CD. Upon receipt of the AKE challenge command, the CD player 100 performs an authentication process with the MD recorder/player 1. If authentication is established, then a proper dubbing operation is initiated between the two devices.

If a reserve mode is established for both the CD player 100 and the MD recorder/player 1 as described above, the two devices will not accept any commands from any device other than the personal computer 200. This means that if an AKE command is sent from the CD player 100 to the MD recorder/player 1 or vice versa, the command will be rejected and no authentication will result.

In the IEEE 1394 system, it is necessary to grasp the attributes of all devices connected to the bus. Information identifying the attributes specific to each device is defined as a subunit identifier descriptor (abbreviated to SID hereunder where appropriate). The information is stored in each device compatible with the IEEE 1394 interface.

At any one time, a device attached to an IEEE 1394 bus in the IEEE 1394 system may request acquisition of SID information from some other device on the bus.

Suppose that in the relations depicted in FIG. 27, it has become necessary for the CD player 100 to obtain SID of the MD recorder/player 1 and that the CD player 100 actually transmits to the MD recorder/player 1 an SID command (abbreviated to SIDC) to request acquisition of the SID of the latter. In that case, the MD recorder/player 1 rejects the command because it is being reserved by the personal computer 200. The SID cannot be obtained from a device placed in the reserve mode.

Such a situation can also occur when either the CD player 100 or the MD recorder/player 1 is placed in the reserve mode.

The reserve commands are also subject to other rules to be described below with reference to FIG. 28. Suppose now that a device serving as a target is being reserved by a controller A and that a bus reset has occurred in that setup. In that case, the reserve mode effective so far is canceled. During 10 seconds following generation of the bus reset, the target can only be reserved by the controller A that has reserved it until the bus reset. In other words, the target accepts only a reserve command issued by the controller A during the 10-second standby period and rejects a reserve command sent by a controller B which has not reserved the target before the bus reset.

Figure 28:
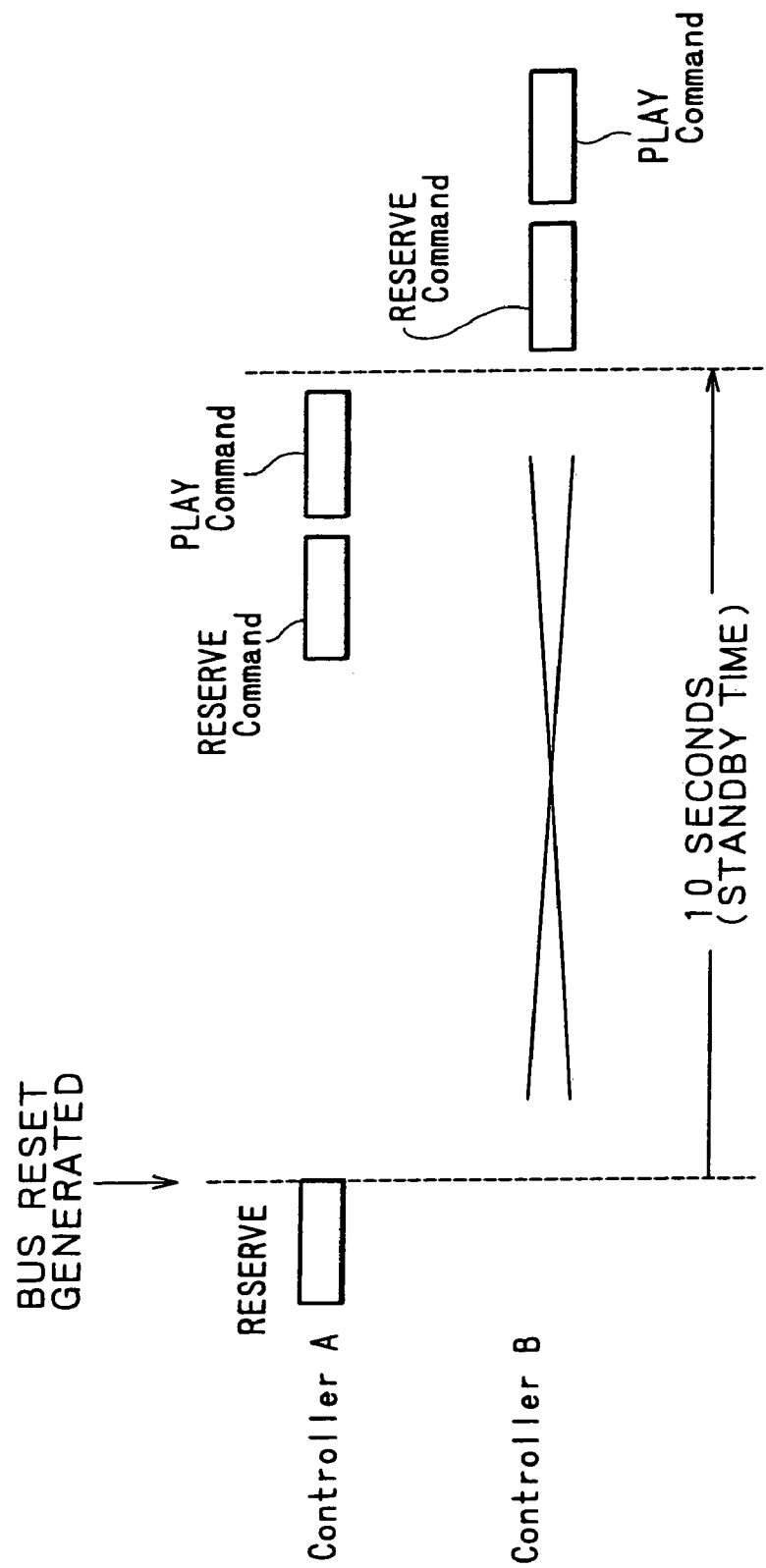
FIG. 28 is a timing chart of a standby period that elapses following a bus reset of a target device reserved by a controller device using a normal reserve command.

If, during the 10-second period after the bus reset, the controller A transmits a reserve command followed by a PLAY command for playback as illustrated in FIG. 28, then the target accepts the commands and establishes another reserve mode while concurrently starting a playback operation. Until 10 seconds elapse after generation of the bus reset, any reserve command sent by the controller B to the target is rejected by the latter.

If the controller A does not reserve the target within the 10-second standby period following the bus reset, the reserve command transmitted by the controller B is accepted by the target after the 10-second period expires. The controller B can now reserve the target. If the controller B sends a PLAY command thereafter to the target, the target responds to the commands and initiates playback.

As described, under rules applicable to reserve commands, the controller B that has not reserved the target before a bus reset cannot reserve it until 10 seconds elapse following the bus reset. A user, having switched to the controller B to reserve the target for remote control following the bus reset, must wait for the standby period of 10 seconds to elapse. Under the circumstances, the user may perceive the 10-second wait as a relatively drawn-out period that can be an impediment to the availability of the system.

The inconveniences outlined above are circumvented by this invention in ways described below.

2-16. Vender Dependent Reserve Commands

In practicing the invention, vendor dependent reserve commands may be defined in addition to the reserve commands (reserve control command and reserve status command) described with reference to FIGS. 25 and 26.

In the description that follows, the reserve commands described in connection with FIGS. 25 and 26 will be referred to as normal reserve commands in distinction from vender dependent reserve commands. The vender dependent reserve commands may be abbreviated to VD reserve commands below where appropriate.

VD reserve commands are allowed to be additionally provided by venders using descriptions of vender dependent commands according to the API of the IEEE 1394 data interface.

Figure 29:
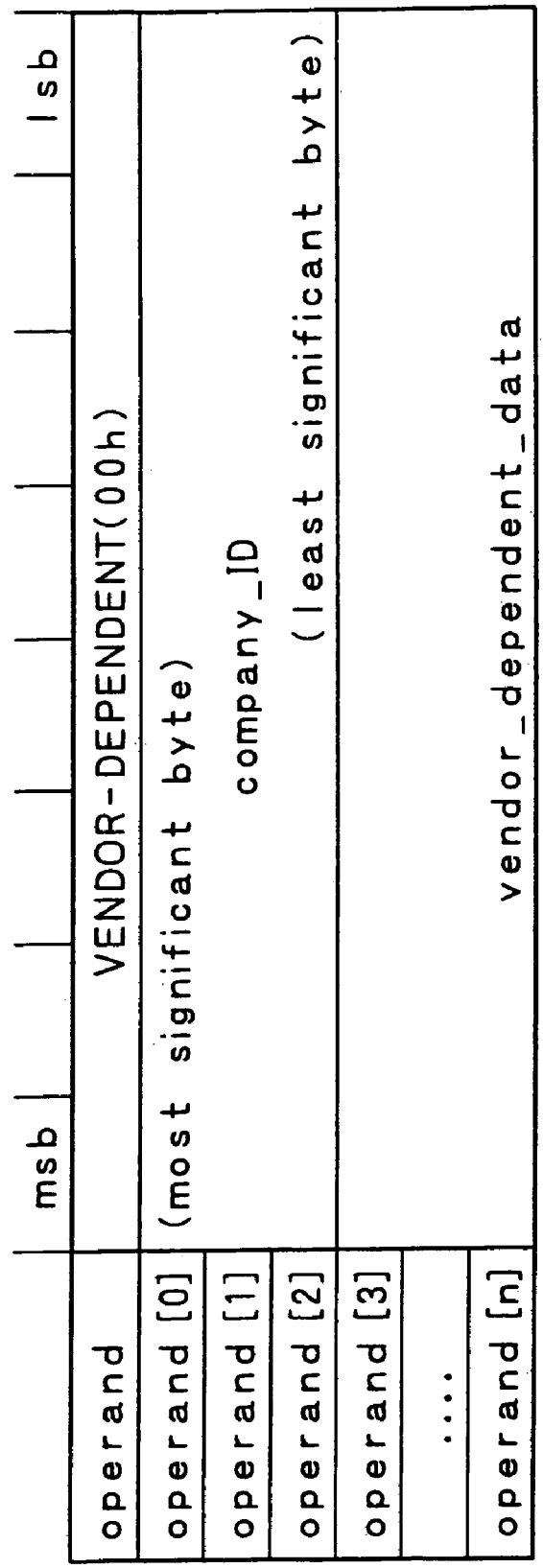
FIG. 29 is a view of a data structure in a vender dependent reserve command.

FIG. 29 shows a data structure of a vender dependent command. This structure is also placed following the opcode in the datafield of the write request packet (AV/C command packet) depicted in FIG. 17.

A value "00h" is set to the eight-bit opcode region. The value identifies a vender dependent command.

A three-byte region made up of operands [0] through [2] accommodates a company ID unique to each vender.

Operands [3] through [n] following the three-byte region of operands [0] through [2] hold vender dependent data designating the contents of the vender dependent command in question. A specific content of the vender dependent data indicates that this is a VD reserve command.

FIG. 30 depicts typical contents of a VD reserve command to reserve an MD recorder/player serving as a target.

The opcode region holds a value "00h" identifying a vender dependent command. The company ID region made of the operands [0] through [2] accommodates values "08h", "00h" and "46h" corresponding to the operands [0] through [2] respectively to identify a specific vender (i.e., manufacturer). A four-byte region made up of operands [3] through [6] retains values "F0h", "03h", "01h" and "02h" corresponding to the operands [3] through [6] respectively. These are values prescribed for operative expediency on the part of the vender identified by the company ID.

Regions of an operand [7] and subsequent operands hold data illustratively in the same manner as with the reserve control command shown in FIG. 25.

The operand [7] holds "01h" indicating that this is an VD reserve command for reserving an MD recorder/player. An operand [8] following the operand [7] stores priority. Operands [9] through [20] accommodate text.

2-17. Processing by the Target in Reserve Mode

When accepting a VD reserve command from a controller, a target enters a VD reserve mode. In the VD reserve mode, the target in principle rejects commands from devices other than the controller that is reserving the target. However, in the inventive setup described herein, the target is made to accept at least a command for handling communication of copy control information called AKE (see FIG. 27) as well as an SIDC (FIG. 27).

Returning to FIG. 27, it is assumed that the personal computer 200 acting as the controller has sent VD reserve commands to the CD player 100 and MD recorder/player 1 serving as targets, placing the latter two devices in the VD reserve mode.

On that assumption, the personal computer 200 executes remote control to have a dubbing operation performed from the CD player 100 to the MD recorder/player 1. At this point, as described above, the CD player 100 and MD recorder/player 1 exchange AKE commands therebetween for AKE authentication. Because the AKE command is accepted by a reserved device when it is in the VD reserve mode, an authentication process involving the AKE is carried out between the CD player 100 and the MD recorder/player 1. If the result of the process is normal, the dubbing operation is allowed to proceed.

Where the CD player 100 and MD recorder/player 1 are both set in the VD reserve mode, the CD player 100 may illustratively transmit an SIDC to the MD recorder/player 1 to acquire the SID of the latter. On receiving the SIDC, the MD recorder/player 1 sends its SID to the CD player 100 in return. This allows the CD player 100 to obtain the SID of the MD recorder/player 1.

If illustratively the MD recorder/player 1 is in the VD reserve mode, it rejects commands other than the AKE command or SIDC (such as operation commands related to recording and playback as well as recorded data editing commands) coming from other controllers. It is thus possible, as with the normal reserve commands, to avert conflict of processing between a target and multiple controllers executing remote control.

In short, even when a target is reserved by a controller so as to reject in principle commands from any other controller, the embodiment of the invention allows the target to accept certain commands such as AKE-related commands so that information affecting operations required by the IEEE 1394 system will not be blocked. This enhances the availability of the IEEE 1394 system.

Figure 31:
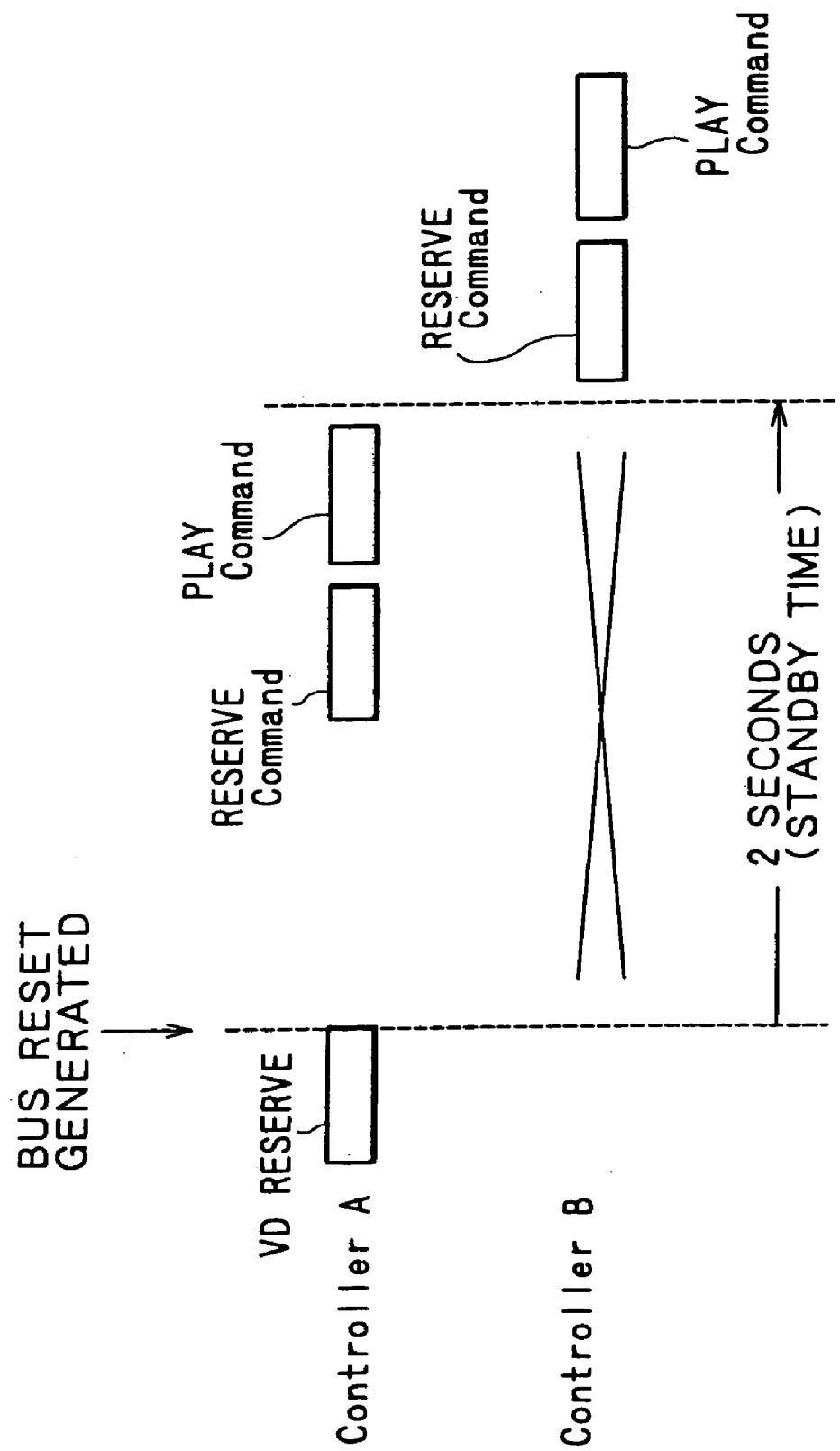
FIG. 31 is a timing chart of a standby time that elapses following a bus reset of a target device reserved by a controller using a vender dependent reserve command.

A device placed in the VD reserve mode accepts a reserve command (normal reserve command or VD reserve command) following a bus reset through a procedure shown in FIG. 31.

Suppose that in the setup of FIG. 31, a controller A has put a target in a VD reserve mode and that a bus reset is generated at a given point in time.

With the VD reserve mode in effect, the standby period of the target explained above with reference to FIG. 28 is set for two seconds. Under this condition, if the controller A is replaced by a controller B to reserve the target following a bus reset, a reserve command transmitted by the controller B two seconds after the bus reset is accepted by the target.

That is, as shown in FIG. 31, the controller B first sends a reserve command followed by a PLAY command to start playback. This operation is carried out upon elapse of as few as two seconds following the bus reset.

Figure 32:
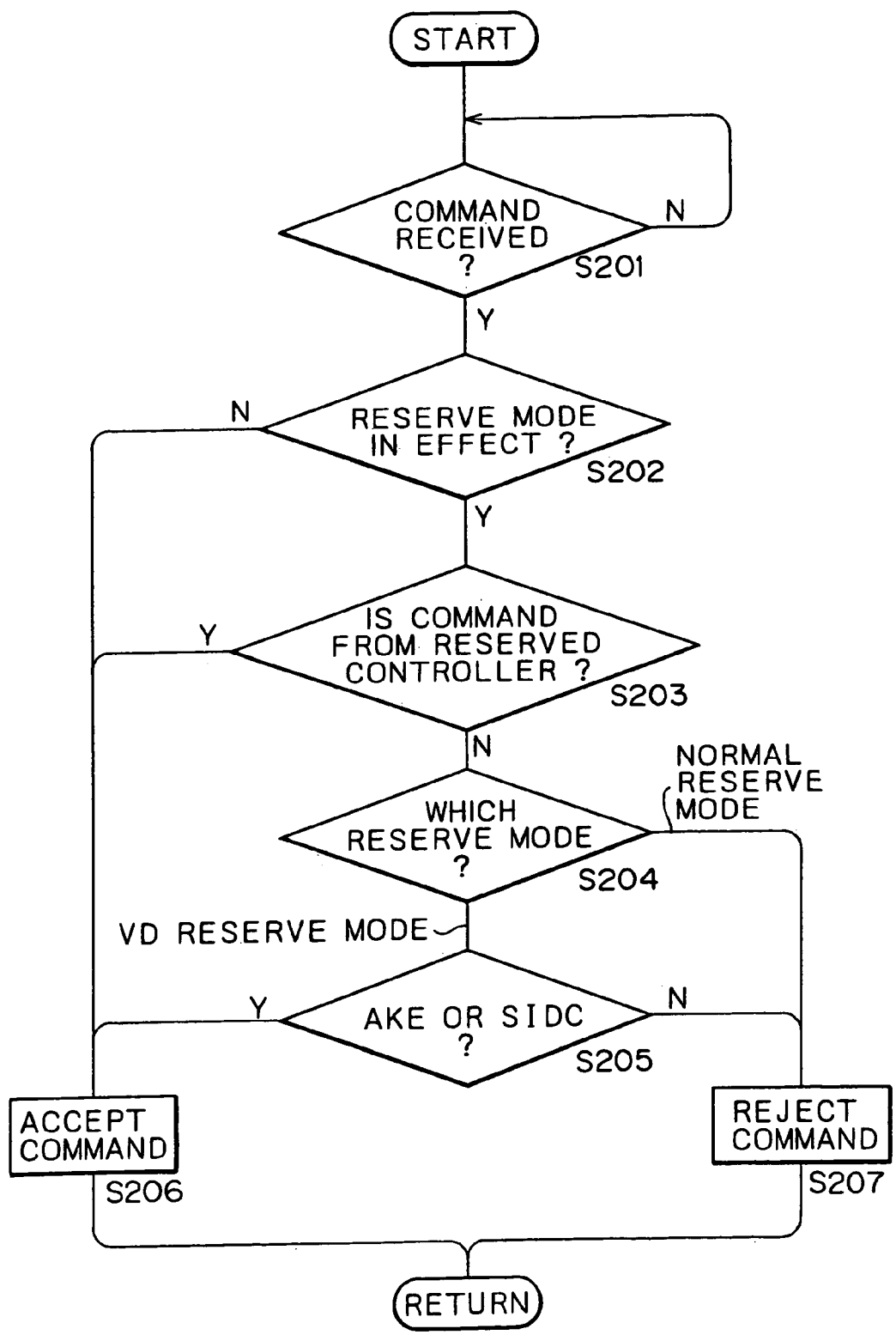
FIG. 32 is a flowchart of steps in which a target device carries out its processing in response to reserve commands received.

Described below with reference to a flowchart of FIG. 32 is what the target side does upon receipt of the above-mentioned AKE command or SIDC. The process shown in FIG. 32 is carried out illustratively by the system controller 11 of the MD recorder/player 1 when the latter serves as the target.

In the process of FIG. 32, the controller waits for a command to be received in step S201. When a command is received, step S202 is reached.

In step S202, a check is made to see if a reserve mode (normal reserve mode or VD reserve mode) is currently in effect. If the reserve mode is found to be established in step S202, step S203 is reached. If the reserve mode is not judged to be in effect, step S206 is reached.

In step S203, the content of the received command is checked to see if the command has been transmitted from the controller currently reserving this MD recorder/player 1. If the command is found to be sent from the relevant controller, step S204 is reached. If the command is judged to be coming from a device (controller) other than that is currently reserving the MD recorder/player 1, then step S206 is reached.

In step S204, a check is made to see whether the currently established reserve mode is the normal reserve mode or the VD reserve mode. If the normal reserve mode is in effect, step S207 is selected; if the VD reserve mode is being selected, step S205 is reached.

In step S205, a check is made to see if the command received in step S201 is any one of the AKE command and SIDC. If the received command is found to be the AKE command or the SIDC, step S206 is reached. If the command is judged to be other than the AKE command or the SIDC, then step S207 is reached.

In step S206, the command received in step S201 is accepted and this routine is terminated. Thereafter a process stipulated by the content of the command is carried out.

In step S207, a notice is issued to reject the command received in step S201. Then this routine is terminated.

The operation ranging from step S202 to step S206 constitutes a process for accepting the received command because no reserve mode is in effect. The operation from step S203 to step S206 makes up a process for accepting the command even though the reserve mode is being established because the command comes from the controller currently reserving the target.

The operation from step S204 to step S207 is a process that rejects the received command because, with the normal reserve mode in effect, the command is coming from a device other than the controller currently reserving the target.

The operation from step S205 to step S207 constitutes a process which, with the VD reserve mode established, rejects a command other than the AKE command or SIDC coming from a device other than the controller reserving the target.

According to the invention, the commands allowed to be accepted in the VD reserve mode are not limited to the AKE command and SIDC alone, and may be supplemented with other commands in keeping with the actual arrangements for use. With the VD reserve mode in effect, the standby period following a bus reset is not limited to two seconds; the duration may be altered as needed.

A plurality of types of VD reserve commands may be defined, with a different command accepted for each VD reserve command. The invention is not limited to the IEEE 1394 criteria only and may be applied to digital data interfaces according to other criteria, standards and recommendations.

As described and according to the invention, two kinds of reserve command are defined: normal reserve command (first reserve command) and VD reserve command (second reserve command). A device acting as a controller transmits any one of these reserve commands. A device serving as a target enters a normal reserve mode when receiving a normal reserve command, or establishes a VD reserve mode upon receipt of a VD reserve command. When the. VD reserve mode is in effect, certain commands are accepted which are included in the information prescribed to be rejected if received from any device other than the controller in the normal reserve mode.

The feature above bypasses conventionally experienced inconveniences, i.e., the inability to receive and respond to a command from a device other than the controller currently reserving the target so as to carry out a certain operation required within the system. This contributes to boosting the availability of the digital interface system.

Further according to the invention, if a target accepting a reserve command enters a VD reserve mode and if a bus reset occurs in the VD reserve mode, it is possible to set a reduced time to elapse before accepting and processing a reserve command from a device other than the controller that has reserved the target prior to the bus reset, the reduced time being shorter than a time set to elapse before receiving and processing a normal reserve command.

The feature above allows the user, after switching to a different controller for reserving the target following a bus reset, to shorten the standby time that must elapse before remote control can be exercised. This also contributes to enhancing the availability of the digital interface system.

As many apparently different embodiments of this invention may be made without departing from the spirit and scope thereof, it is to be understood that the invention is not limited to the specific embodiments thereof except as defined in the appended claims.

The invention claimed is:

1. A control method for controlling a plurality of target devices connected to a data bus for transferring data in a predetermined communication format, said control method comprising:

generating a first reserve command for permitting transmission of commands from the controller device sending the first reserve command to a first target device that accepts the first reserve command from the controller device, and for inhibiting communication between the first target device and all other of the target devices and all other controller devices;

generating a second reserve command for permitting transmission of commands from the controller device to the first target device, and for permitting transmission of at least one designated command to said first target device from other controller devices, and for inhibiting communication of other than the at least one designated command to said first target device from the other controller devices; and selectively transmitting to said target devices and other controller devices said first reserve command and selectively transmitting to said target devices said second reserve command, wherein said predetermined communication format complies with IEEE 1394 criteria.

2. A control method for use in a communication system including a controller device, a data bus for transferring data in a predetermined communication format, and a plurality of target devices connected via said data bus to said controller device, said control method comprising:

generating a first reserve command for permitting transmission of commands from the controller device sending the first reserve command to a first target device that accepts the first reserve command from the controller device, and for inhibiting communication between the first target device and all other of the target devices and all other controller devices;

generating a second reserve command for permitting transmission of commands from the controller device to the first target device, and for permitting transmission of a designated command to said first target device from other controller devices;

generating a bus reset command for resetting said data bus for transferring data in said predetermined communication format; and selectively transmitting to said target devices and other controller devices said first reserve command selectively transmitting to said target devices said second reserve command, and selectively transmitting to said target devices said bus reset command; and wherein in each of said target devices the method further comprises:

receiving said first reserve command, said second reserve command, and said bus reset command;

judging whether a reserve command received by said receiving is said first reserve command or said second reserve command; and validating a reserve command received by said receiving upon elapse of a first predetermined time following a bus reset if the reserve command thus received is judged to be said first reserve command; validating a reserve command received by said receiving upon elapse of a second predetermined time following said bus reset, said second predetermined time being shorter than said first predetermined time, if the reserve command thus received is judged to be said second reserve command.

3. A communication system according to claim 2, wherein said specific command transmitted to said first target device provides authentication between said first and another target device.

4. A communication system according to claim 2, wherein said specific command transmitted to said first target device identifies attributes of any one of said first and another target device.

5. A communication system according to claim 2, wherein said predetermined communication format complies with IEEE 1394 criteria.

6. A communication system according to claim 2, further comprising selecting either said first reserve command or said second reserve command for transmission to said target devices.

7. A control method for use in a communication system including a controller device, a data bus for transferring data in a predetermined communication format, and a plurality of target devices connected via said data bus to said controller device, said control method device comprising:

generating a first reserve command for permitting transmission of commands from the controller device sending the first reserve command to a first target device that accepts the first reserve command from the controller device, and for inhibiting communication between the first target device and all other of the target devices and all other controller devices;

generating a second reserve command for permitting transmission of commands from the controller device to the first target device, and for permitting transmission of at least one designated command to said first target device from other controller devices, and for inhibiting communication of other than the at least one designated command to said first target device from the other controller devices; and selectively transmitting to said target devices and other controller devices said first reserve command and selectively transmitting to said target devices said second reserve command;

wherein each of said target devices selectively receives said specific command from said another target device in accordance with the second reserve command transmitted in said selective transmitting, and wherein said predetermined communication format complies with IEEE 1394 criteria.

* * * * *